(12) United States Patent
Tucker et al.

(10) Patent No.: US 9,465,960 B2
(45) Date of Patent: Oct. 11, 2016

(54) PHYSICS-BASED AUTHENTICATION

(71) Applicant: Honeywell International Inc., Morristown, NJ (US)

(72) Inventors: James L. Tucker, Clearwater, FL (US); Kenneth H. Heffner, Largo, FL (US); Jeffrey J. Kriz, Eden Prairie, MN (US); Robert Compton, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 90 days.

(21) Appl. No.: 14/097,094

(22) Filed: Dec. 4, 2013

(65) Prior Publication Data

US 2015/0156184 A1    Jun. 4, 2015

(51) Int. Cl.
*H04L 9/00* (2006.01)
*G06F 21/73* (2013.01)
*H04L 29/06* (2006.01)

(52) U.S. Cl.
CPC .......... *G06F 21/73* (2013.01); *H04L 63/0876* (2013.01)

(58) Field of Classification Search
CPC ................................ H04L 9/14; H04L 63/08
See application file for complete search history.

(56) References Cited

U.S. PATENT DOCUMENTS

| | | | |
|---|---|---|---|
| 6,233,339 B1 * | 5/2001 | Kawano et al. | ................ 380/44 |
| 6,893,877 B2 | 5/2005 | Hunter et al. | |
| 7,082,539 B1 | 7/2006 | Kitahara et al. | |
| 7,195,872 B2 | 3/2007 | Agrawal et al. | |
| 7,246,240 B2 | 7/2007 | Chuang et al. | |
| 7,316,899 B2 | 1/2008 | McDevitt et al. | |
| 7,539,308 B2 | 5/2009 | Conti et al. | |
| 7,840,803 B2 | 11/2010 | Clarke et al. | |
| 8,264,689 B1 | 9/2012 | Azzazy et al. | |
| 8,379,856 B2 | 2/2013 | Potkonjak | |
| 2002/0197622 A1 | 12/2002 | McDevitt et al. | |
| 2003/0163711 A1 | 8/2003 | Grawrock | |
| 2005/0118960 A1 | 6/2005 | Miyazaki | |
| 2006/0018476 A1 | 1/2006 | Nickel | |

(Continued)

FOREIGN PATENT DOCUMENTS

| WO | 2006074153 A2 | 7/2006 |
|---|---|---|
| WO | 2007011865 A2 | 1/2007 |

OTHER PUBLICATIONS

McGuyer, "Atomic Physics With Vapor-Cell Clocks," A dissertation presented to the faculty of Princeton University, Jun. 2012, 195 pp.

(Continued)

*Primary Examiner* — Izunna Okeke
(74) *Attorney, Agent, or Firm* — Shumaker & Sieffert, P.A.

(57) ABSTRACT

In some examples, a controller is configured to generate a key based on a physics-based output of a component. The controller may, for example, use the key to authenticate communication between at least two nodes, to encrypt data, or to decrypt data. In some examples, the component includes one or more subcomponents, each subcomponent including a cell filled with a gas, a light source configured to transmit a light through the gas cell, and a photodetector configured to sense light transmitted through the gas cell. The photodetector of each subcomponent is configured to generate an electrical signal that changes as a function of one or more properties of the light sourced by the light source, transmitted through the gas cell. The output of the component can is based on the signals generate by the one or more photodetectors.

17 Claims, 11 Drawing Sheets

(56) References Cited

U.S. PATENT DOCUMENTS

| | | | |
|---|---|---|---|
| 2006/0271793 | A1 | 11/2006 | Devadas et al. |
| 2007/0262847 | A1 | 11/2007 | Grabinger et al. |
| 2008/0019514 | A1 | 1/2008 | Stromberg et al. |
| 2010/0067685 | A1 | 3/2010 | Okita |
| 2010/0199092 | A1* | 8/2010 | Andrus et al. ............ 713/171 |
| 2012/0178335 | A1 | 7/2012 | Eden et al. |
| 2012/0285198 | A1 | 11/2012 | Shang |
| 2013/0009214 | A1 | 1/2013 | Bustillo et al. |

OTHER PUBLICATIONS

Frikken et al., "Robust Authentication Using Physically Unclonable Functions," ISC 2009, Sep. 7-9, 2009, Lecture Notes in Computer Science (LNCS), vol. 5735, pp. 262-277.

Rosenfeld et al., "Sensor Physical Unclonable Functions," 2010 IEEE International Symposium on Hardware-Oriented Security and Trust (HOST), Jun. 13-14, 2010, 6 pp.

Kitching et al., "Miniature vapor-cell atomic-frequency references," 2002 American Institute of Physics, Applied Physics Letters, vol. 81, No. 3, Jul. 15, 2002, pp. 553-555.

Ralph, "Quantum Optical Systems for the Implementation of Quantum Information Processing," Centre for Quantum Computer Technology, Department of Physics, University of Queensland, St. Lucia 4072, Australia, 29 pages, Feb. 1, 2008.

Weier, "Experimental Quantum Cryptography," Physik-Department, 91 pages, Dec. 12, 2003.

Meguerdichian et al., "Security Primitives and Protocols for Ultra Low Power Sensor Systems," Sensors, IEEE, 4 pages, Oct. 28-31, 2011.

Meguerdichian et al., "Matched Public PUF: Ultra Low Energy Security Platform," International Symposium on Low Power Electronics and Design, 6 pages, Aug. 1-3, 2011.

Nabeel et al., "Authentication and Key Management for Advanced Metering Infrastructures Utilizing Physically Unclonable Functions," IEEE SmartGridComm 2012 Symposium—Cyber Security and Privacy, 6 pages, Nov. 2012.

Pappu, et al., "Physical One-Way Functions", Science, vol. 297, No. 5589, Sep. 20, 2002, pp. 2026-2030.

Gassend, et al., "Silicon Physical Random Functions", Computer Science and Artificial Intelligence Laboratory, Massachusetts Institute of Technology, In the Proceedings of the Computer and Communication Security Conference, Washington, DC, USA, 14 pages, Nov. 2002.

Beckmann, et al., "Hardware-Based Public-Key Cryptography with Public Physically Unclonable Functions", S. Katzenbeisser and A.R. Sadeghi (Eds.): IH 2009, LNCS 5806, 2009, pp. 206-220.

Guajardo, et al., "Philips FPGA Intrinsic PUFs and Their Use in IP Protection", 22 pages, CHES 2007, Sep. 11, 2007.

Konig, et al., "Locking of Accessible Information and Implications for the Security of Quantum Crytography," Phys. Rev. Letters 98, 5 pages, Jan. 2006.

* cited by examiner

PHYSICS-BASED AUTHENTICATION

TECHNICAL FIELD

This disclosure relates to hardware authentication and secure communication.

BACKGROUND

In some cases, it may be desirable to authenticate an electronic device, e.g., to secure communication between two or more nodes (e.g., two devices at the same location or separate locations).

SUMMARY

The disclosure describes example devices, systems, and techniques for authenticating a device, e.g., to authenticate hardware of the device, to secure communication between nodes, or both, using a physics-based output generated by a component of the device. The component is configured to generate the physics-based output based on a property of light transmitted through a gas cell. In this way, the component can be configured to transform a unique input into a unique output. The physics-based output can be matched to the physics-based output of one or more other components, thereby resulting in matched sets of components that can be used to authenticate electronic devices. While the physics-based output of the component is unique, the physics-based output can be modified to match a physics-based output of another component by, for example, modifying one or more parameters, such as the operating temperature of the component, magnetic fields in which the component is positioned, one or more parameters of the input, such as the laser power and laser wavelength, or any combination of parameters.

In some examples, the component comprises one or more subcomponents, each subcomponent including at least one gas cell, a light source configured to transmit a light through gas in the at least one gas cell, and a photodetector. The gas in each cell and the frequency of the light generated by the light source are selected such that the light is modulated as it transmits through the gas cell, e.g., the gas may absorb at least some light. The photodetector of each subcomponent is configured to generate an electrical signal that changes as a function of one or more properties of the resultant light transmitted through a gas cell. The physics-based output of the component can be based on the one or more electrical signals generated by the one or more photodetectors of a component. The electrical signal output of each subcomponent forms a basis of authentication rooted in the physics-based properties of the gas cell that are specific for controlling the properties of light. The physics-based properties of the subcomponent that may control the behavior of light include, for example, the length of the light path, frequency, refractive index of the light path media, materials of composition of the component, pressure of the gas in the gas cell, the refractive index of materials forming the gas cell or otherwise present in an optical pathway of the component, gas absorption coefficients, the properties of the light source itself, the dimensions of the gas cell, and the like.

In examples in which the component includes a plurality of subcomponents, at least two of the subcomponents may include gas cells having different gas compositions; the gas in the respective gas cells of at least two subcomponents may absorb different amounts of light of a particular wavelength. In this way, at least two subcomponents may generate different suboutputs in response to substantially the same light input (e.g., light having substantially the same wavelength).

The disclosure also describes devices, systems, and techniques for securing communication between at least two nodes. The nodes may be, for example, devices (e.g., computing devices) of a network that are in the same location or at different locations, elements of a common device, or any other entities that may communicate with each other to, for example, exchange information or to relay information between other entities. In some examples, a component (e.g., an emitter, sensor, sensor array, semiconductor device, or a component comprising one or more light sources, a plurality of gas cells, and one or more photodetectors) of a node is configured to generate a detectable output (e.g., a particle or waveform) that is based on a physical configuration of the component (e.g., the physical characteristics of the component or the composition of the gas in the gas cells). This output may be referred to as a physics-based output, and, in some examples, may be incidentally generated by the component, e.g., statically generated or generated in response to a stimulus applied to the component. In some examples, the detectable output of a component may be modified by changing the physical characteristics of the component or an input (e.g., a stimulus) applied to the component to generate the output, one or more parameters of the operating environment for the component, or any combination thereof. In some examples, the device output can be further manipulated through a secondary input from another device or through firmware in the circuit. A key, e.g., an authentication key, an encryption key for encrypting data, a decryption key for decrypting data, or any combination thereof, may be generated based on the detectable output of the component. The uniqueness of the key is rooted in the physics of the signal source provided by the device.

In some examples, a network includes at least two nodes that are configured to communicate with each other. The nodes may be separate platforms (e.g., pieces of equipment) or may be a part of the same platform. Each of the nodes of the network includes a component that is configured to generate a detectable physics-based output. Each node is configured to generate a key (also referred to herein as a "physics-based key") based on the detectable output. In some examples, a first node of the network may be configured to generate and transmit the key to a second node of the network; the second node may then authenticate the first node based on the received key or authenticate a communication from the first node based on the received key. In addition or instead, the first node may be configured to encrypt data using the key and the second node may be configured to decrypt data using a respective key generated based on the output of the respective component.

In some examples, internal nodes of a host electronic system are configured to communicate with one another based on the substantially concurrent generation and confirmation of the physics-based keys. The integrity of the host system can be verified through the communication of the internal nodes, thereby assuring that the system has not been compromised through software or hardware attacks on the host system. Through this example, the physics-based device provides an anti-tamper protection system while concurrently providing secure communications encryption. In this manner a means for trusted supply chain is possible for multiple industries were electronics systems are used.

In one example, the disclosure is directed to a system comprising a component configured to generate an output, wherein the component comprises a plurality of gas cells each filled with a gas, at least one light source configured to emit a light that transmits through at least one gas cell of the plurality of gas cells, and at least one photodetector configured to generate a signal indicative of a property of the light transmitted through the at least one gas cell, wherein the output generated by the component is based on the signal generated by the at least one photodetector. The system further comprises a controller configured to generate a key based on the output.

In another example, the disclosure is directed to a method comprising generating, by a component, an output, and generating, by a controller, a key based on the output. The component comprises a plurality of gas cells each filled with a gas, wherein at least two gas cells are filled with different compositions of gas, at least one light source configured to emit a light that transmits through at least one gas cell of the plurality of gas cells, and at least one photodetector configured to generate a signal indicative of a property of the light transmitted through the at least one gas cell, wherein the output generated by the component is based on the signal generated by the at least one photodetector.

In another example, the disclosure is directed to a system comprising means for generating a physics-based output, and means for generating, by a controller, a key based on the output. The means for generating the physics-based output comprises means for generating radiation, means for modulating the radiation, and means for sensing the radiation modulated by the means for modulating the radiation. In some examples, the means for generating radiation comprises a light source, the means for modulating the radiation comprises at least a first gas cell, and the means for sensing the radiation comprises a photodetector.

In another example, the disclosure is directed to a method comprising attaching at least one light source to a substrate, the at least one light source being configured to emit a light, attaching at least one photodetector to the substrate, attaching a first plurality of cells to the substrate such that the light transmitted through at least one gas cell of the plurality of gas cells is sensed by the photodetector, and attaching a second plurality of cells to the first plurality of gas cells, wherein the first plurality of cells is positioned between the at least one light source and the at least one photodetector.

In another example, the disclosure is directed to an article of manufacture comprising a computer-readable storage medium. The computer-readable storage medium comprises computer-readable instructions for execution by a processor. Upon execution, the instructions cause a processor to perform any part of the techniques described herein. The instructions may be, for example, software instructions, such as those used to define a software or computer program. The computer-readable medium may be a tangible computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a processor to perform the techniques described herein. The computer-readable medium may be referred to as non-transitory in the sense that it is embodied in a tangible structure, such as a storage device or memory.

The details of one or more examples are set forth in the accompanying drawings and the description below. Other features, objects, and advantages in addition to those described below will be apparent from the description and drawings, and from the claims.

DETAILED DESCRIPTION

Figure 1:
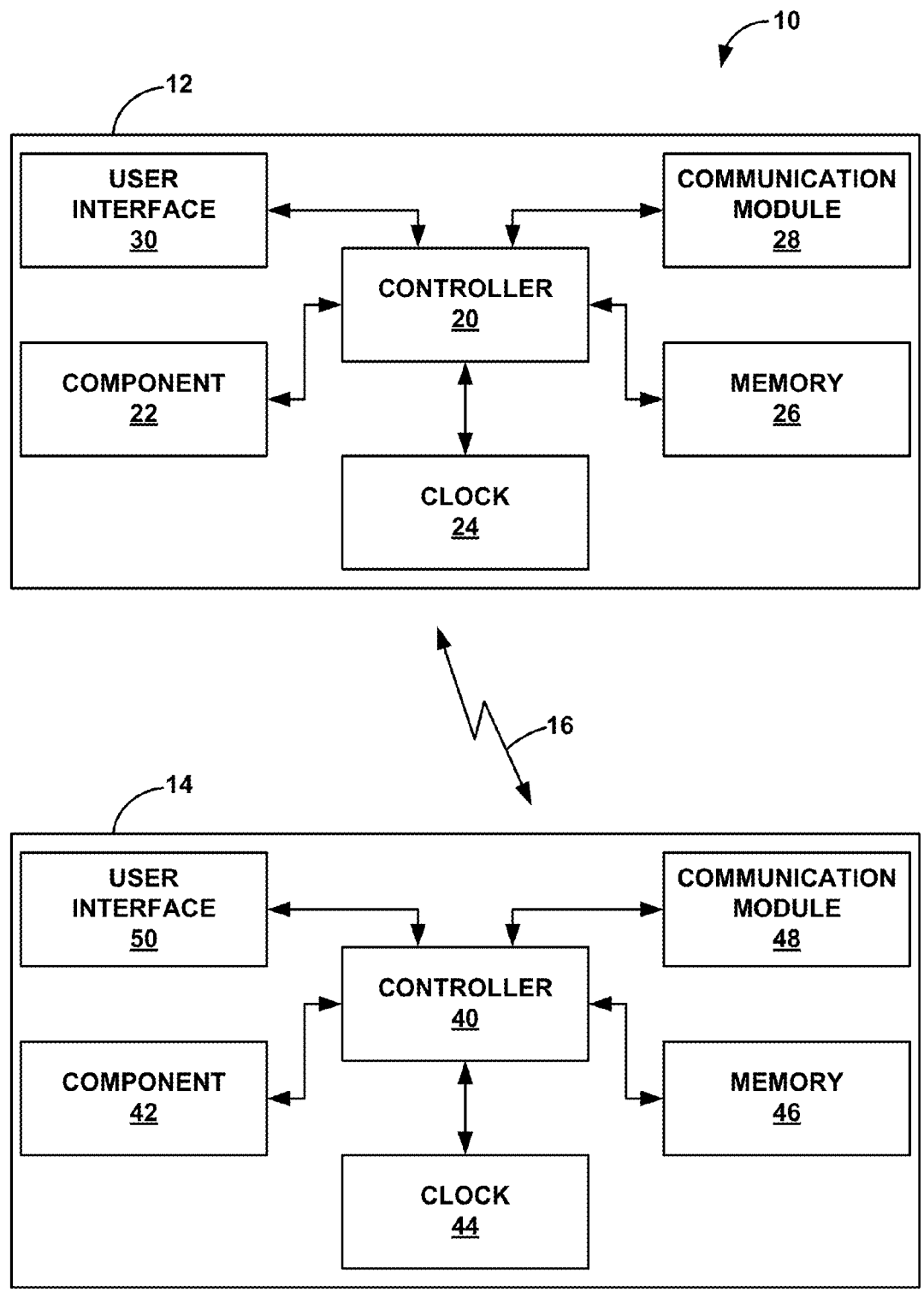
FIG. 1 is a functional block diagram of an example system that includes a first node and a second node configured to communicate with each other and authenticate each other based on a key generated from a physics-based output of a component.

Example devices, systems, and techniques for generating a key based on a physics-based output of a component are described in this disclosure. A physics-based output of a component may be, for example, a particle, ringdown, or waveform, and may be based on the physical configuration of the component. For example, the physics-based output may be characteristic of one or more physical characteristics of the component. As an example, a component may include one or more subcomponents, each subcomponent including a cell filled with a gas (referred to herein as a "gas cell"), a light source configured to transmit a light through the gas cell, and a photodetector configured to sense light transmitted through the gas in the gas cell. The frequency of the light generated by the light source and transmitted through the gas cell may be selected such that the gas absorbs at least some light transmitted through the gas cell. The photodetector of each subcomponent can be configured to generate an electrical signal that changes as a function of one or more properties (e.g., an intensity) of the light sourced by the light source, transmitted through the gas, and sensed by the photodetector. The physics-based output of the component may be defined by the resultant signal generated by the one or more photodetectors. The physics-based output of a component can be matched to the physics-based output of one or more other components, thereby resulting in matched sets of components that can be used to authenticate electronic devices.

As discussed in further detail below, in some examples, a key generated based on a physics-based output of one or more components may be used to authenticate a device, such as to confirm that software of the device is running on the intended hardware and that the software has not been copied, cloned, or hacked. Such authentication based on a hardware feature of the one or more components may be less susceptible to counterfeiting or tampering compared to, for example, software features that attempt to authenticate the device. This device authentication may be useful for various applications, including intelligence applications, military application, and cyber security applications.

In addition, device authentication based on a physics-based output of one or more components may be used for various purposes, such as, to authenticate a single device, e.g., by another device or by the device itself, or to secure communications between two or more nodes. The nodes may be, for example, devices (e.g., computing devices or another electronic system) of a network that are in the same location or at different locations, elements of a common device (e.g., two integrated circuits of a computing device), or any other entities that may communicate with each other to, for example, exchange information or relay information between entities.

For example, the keys may be used to authenticate trust for a communication (e.g., a communication signal or packet, such as a data packet, communication packet, or instruction packet) that is sent or received by a node. In some examples, the authentication is time sensitive, such that the keys may be used to authenticate trust for a communication that is sent or received by a node within a predetermined time period associated with the keys. The nodes may each periodically regenerate the keys, e.g., as the output of the components change, such that the keys may only be used to authenticate communications between two or more nodes during a predetermined time period. Because a physics-based output of a component may be based on the physical configuration of the component, the keys used to secure communication between two nodes may be physical functions of the respective nodes.

In addition to, or instead of, using physics-based outputs from components for authenticating communications between two or more nodes, in some examples, physics-based keys may be used to encrypt and decrypt data communicated between two or more nodes. For example, a first node may use a first key generated based on a physics-based output of a first component of the first node to encrypt data, and a second node may receive the encrypted data from the first node and decrypt the data using a second key generated based on a physics-based output of a second component of the second node. The first and second keys are substantially similar and, in examples in which the keys are time matched, the keys may be generated by the respective nodes at substantially the same time. In this way, the components described herein can be used as an algorithmic cryptographic element of a device.

Securing communication between two or more nodes using the devices, systems, and techniques described herein may help secure a host node's critical program information, proprietary data, intellectual property, or any combination thereof, and help prevent eavesdropping of the communications by a third party, interception of information being communicated between the nodes by a third party, or corruption of the information being communicated between the nodes.

Secure communications may help protect personnel, security interests, and critical infrastructure. Adversaries may gain access to critical assets through operating systems, information technology, and networks used as the media for delivering communications for command and control operations to these assets. Securing communication between two or more nodes using keys generated based on physics-based outputs of components may help minimize or even prevent reverse engineering.

FIG. 1 is a functional block diagram of system 10, which include first node 12 and second node 14. First node 12 and second node 14 are configured to communicate with each other via communication channel 16, which may be a wired communication channel, a wireless communication channel, an optical communication channel or a combination of any two or more of wired, optical, and wireless communication channels. In some examples, first and second nodes 12, 14, respectively, may each be an electronic device (e.g., a computing device or a secure communication terminal) that is configured to send and receive data over communications channel 16. In addition, or instead, one or both nodes 12, 14 may be a router configured to route (or relay) communications (e.g., messages) transmitted by one entity to another entity of system 10.

Nodes 12, 14 may be a part of any suitable type of network in which at least one node 12 or 14 is configured to send data to the other node 12 or 14, which is configured to receive the data. In some examples, nodes 12, 14 are configured to both send and receive data from each other. Nodes 12, 14 may be a part of any suitable type of network in which nodes 12, 14 may send or receive information, and, in some cases, share resources, with each other, and, in some examples, other additional nodes of the network (not shown in FIG. 1). For example, nodes 12, 14 may each hardware in a supply chain, e.g., in an electrical grid (e.g., a smart grid) used to distributed electricity. The keys described herein can be used to, for example, detect a compromise in the supply chain.

As discussed in further detail below, in some examples, nodes 12, 14 of system 10, and, in some examples, other nodes of system 10, may be configured to generate substantially the same key (e.g., the same or nearly the same) based on the physics-based outputs generated by the respective components at substantially the same time (e.g., the same or nearly the same). The components of each of the nodes of system 10 that are configured to securely communicate with each other are configured to generate substantially the same output at substantially the same time, such that the keys generated based on the physics-based outputs are substantially the same. These keys may be referred to as "time matched" in that they are generated based on the outputs of the respective components generated at substantially the same time. The nodes of system 10 may authenticate each other, messages received from another node of system 10, encrypt data transmitted to another node of system, decrypt data received from another node of system 10, or any combination thereof using time-matched keys. In some examples, nodes of system 10 may be configured to encrypt and decrypt data communication with each other using another key in addition to, or instead of, the physics-based key.

In other examples, node 12, 14 (and, in some examples, other nodes of system 10) may be configured to generate substantially the same key based on the physics-based outputs generated by the respective components at different times. In this example, the components of nodes 12, 14 are configured to generate substantially the same physics-based output, independent of the time at which the output is generated. In either the time-matched keys example or the example in which the keys are matched regardless of the time at which the keys are generated, the components of nodes 12, 14 may be referred to as a "matched set."

While the physics-based output of the components of nodes 12, 14 are unique, the physics-based outputs can be modified to match each other. For example, outputs of one or both components can be manipulated by modifying one or more parameters, such as the operating temperature of the component, magnetic fields in which the component is positioned, one or more parameters of the input, such as the laser power and laser wavelength, or any combination of parameters.

In some examples, the components in the matched set, which may include two or more components configured to generate substantially the same physics-based output, include substantially identical arrays of gas cells filled with gas. As discussed in further detail below, in some examples, each gas cell is a part of a respective subcomponent that further includes a light source configured to transmit a light through the gas in the gas cell and a photodetector configured to sense light transmitted through the gas in the gas cell and generate an electrical signal indicative of a property of the sensed light. Matched sets of components can be formed to have substantially similar (e.g., identical) gas cells or arrays of gas cells. For example, each substantially similar gas cell can be formed from the same wafer.

In the example shown in FIG. 1, first node 12 comprises controller 20, component 22, clock 24, memory 26, communications module 28, and user interface 30. Controller 20 may be configured to control the operation of component 22, clock 24, and communications module 28, and is configured to receive user input via user interface 30, and store data to and retrieve data from memory 26. Controller 20 can comprise any suitable arrangement of hardware, software, firmware, or any combination thereof, to perform the techniques attributed to controller 20 and first node 12 herein. For example, controller may include any one or more microprocessors, digital signal processors (DSPs), application specific integrated circuits (ASICs), field programmable gate arrays (FPGAs), or any other equivalent integrated or discrete logic circuitry, as well as any combinations of such components.

Controller 20 is configured to receive information indicative of the output generated by component 22 and generate a key based on the detected output. For example, as described with respect to FIGS. 4 and 5, controller 20 may implement an algorithm (e.g., a software algorithm) to generate a digital key from an analog output generated by component 22. The information indicative of the output generated by component 22 may be, for example, an electrical signal generated by component 22, a parameterized electrical signal generated by component 22, or data generated based on the raw electrical signal generated by component 22, such as one or more signal characteristics extracted from the electrical signal.

Component 22 is a physical structure that is configured to generate a detectable output, such as an analog output (e.g., an analog electrical signal), a quantum output (e.g., a particle or photon), or an electromagnetic output (e.g., a change in an orientation of a plane of polarization of a layer of component 22). The output of component 22 may be received by controller 20 (directly or indirectly) as an electrical signal. In some examples, the type of component 22 for a particular node 12 may be selected based on the operating environment in which node 12 is expected to be used or designed to be used, such that component 22 exhibits robust stability through use in the operating environment. In some examples, component 22 is also selected to be the same type of component as the components of other nodes of system 10.

The output generated by component 22 may be based on, and in some cases, unique to, the physical configuration of component 22. The output generated by component 22 is dependent on the physical configuration (e.g., characteristics, such as, but not limited to, the chemical composition, the macro-dimensions of the component, the micro-structure of the component, the type of component, the configuration of an array of gas cells, the composition of the gas of the gas cells, or any combination thereof) of component 22, and may be referred to as a physics-based output. In this way, the output generated by component 22 is a function of the physical configuration of component 22, and is modulated by the physical configuration of component 22. The differences in the physical configuration of component 22 that may modulate the output generated by component 22 may not significantly affect the performance of component 22. However, differences in the physical configuration between components may provide a rich source of variation in the output (e.g., an analog output) that can be exploited to generate a key.

As described in further detail below, the output generated by component 22 may be modified by changing the physical characteristics of component 22, the input provided to component 22 to generate the output, or one or more external factors (e.g., one or more of a temperature of the environment in which component 22 operates, a humidity level of the environment in which component 22 operates, magnetic fields in which component 22 is positioned, and the like). In this way, a key generated by node 12 may be modified without having to replace component 22. The output of component 22 is modified in some examples in this manner in order to match the output of component 22 to a component of another node, such as component 24 of node 14. Physically random functions of two components can be modified in some examples described herein to behave the same in a distinct, unique set of devices.

In some examples in which component 22 includes an array of gas cells, the composition of the gas, the number of gas cells, the number and position of gas cells having different gas compositions within the array, the power of the light emitted through the gas cells, the wavelength of the light emitted through the gas cells, and external factors listed above may be modifiable attributes that can change the physics-based output of component 22.

Due at least in part to the ability to modify the physics-based output of component 22, a plurality of components 22 may be fabricated (e.g., in a die) in a common lot and may be configured to behave similarly. The components that are configured to behave similarly, either through physical modification, modification to the inputs to the components, modification to external factors, or any combination thereof, may then be used in a system 10 to authenticate nodes 12, 14 or to encrypt/decrypt data transmitted between nodes 12, 14.

In some examples, component 22 may incidentally generate the output, e.g., statically, or component 22 may generate the output in response to a stimulus applied to component 22 (e.g., by controller 20). While the output generated by component 22 is described in some examples as an analog output, in other examples, the component may be configured to generate a digital output. For example, in examples in which component 22 includes an array of gas cells, component 22 may generate a digital output. If, for example, an array of analog signals is generated by component 22, a comparator or the like can be used to convert the array of analog signals into an array of digital signals.

In some examples, component 22 includes one or more subcomponents, each subcomponent including a gas cell, a light source configured to transmit a light through the gas in the gas cell, and a photodetector configured to sense light transmitted through the gas in the cell. The light can be any suitable radiation that may or may not be visible to a human eye. As discussed in further detail below, the frequency of the light generated by the light source and transmitted through the gas in the gas cell is selected such that the gas absorbs at least some light transmitted through the gas cell. The photodetector of each subcomponent is configured to generate an electrical signal that changes as a function of one or more properties of the light sourced by the light source, transmitted through sensed by the photodetector. The output of component 22 can be based on the signals generate by the one or more photodetectors.

In some examples in which the component includes a plurality of subcomponents, at least two of the subcomponents include gas cells having different gas compositions, such that the gas in the respective gas cells of the at least two subcomponents absorb different amounts of light of a particular wavelength. In this way, at least two subcomponents may generate different outputs in response to substantially the same light input. The output generated by a subcomponent may also be referred to herein as a suboutput. In some examples, each gas cell is associated with a respective light source and a respective photodetector. The output of component 22 can be a signal that is based on the one or more signals generate by the one or more photodetectors.

In addition to, or instead of, all of the photodetectors of the subcomponents of component 22 being used to generate the output, the output may be generated based on the output from a select subset of the subcomponents. For example, controller 20 may be configured to control the light sources of only a subset of the subcomponents to deliver the light to the respective gas cells, or control the photodetectors of only a subset of the subcomponents to sense the light emitted through the gas in the respective gas cells, or both. As another example, controller 20 may be configured to control the light sources of each of the subcomponents to deliver the light and control the photodetectors of each of the subcomponents to sense the transmitted light, but may only generate the output based on the signals from only a selected subset of the subcomponents. In this way, controller 20 may actively change the key that is generated by changing the subcomponents that are used to generate the output of component 22, and without having to replace the entire component 22.

In some examples in which component 22 includes one or more subcomponents including gas cells, the output of component 22 may be modified by, for example, modifying the wavelength of the light applied to the gas, modifying the gas within one or more gas cells, modifying the subset of subcomponents that generate the output of component 22, modifying one or more external factors, or any combination thereof.

Component 22 comprising a plurality of gas cells filled with a gas is configured to yield a response function that is capable of being produced or duplicated in substantially matched sets of gas filled cells, but is difficult or even impossible to reproduce or characterize by reverse engineering. For example, component 22 comprising a plurality of cells filled with a gas may be designed such that an attempt to measure the physical characteristics of component 22 may change or destroy the characteristics of one or more subcomponents (e.g., one or more cells, light sources, or photodetectors), and, therefore, the output generated by component 22 may change in response to the attempt to measure the physical characteristics of component 22. This may ultimately change the key generated by controller 20 and cause the key generated by controller 20 of node 12 to be different than a key generated by another node of system 10 that includes a matched component.

In examples in which a component includes one or more light sources, an array of gas cells, and one or more photodetectors, the component may be referred to as an atomic component. An example of an atomic component is described below with respect to FIGS. 6-8.

In addition to, or instead of, component 22 including an array of gas cells, in some examples, component 22 includes one or more of an emitter, a sensor, or a sensor array, such as those described in U.S. patent application Ser. No. 13/766,201 by Heffner, which was filed on Feb. 13, 2013 and is entitled, "PHYSICS-BASED KEY GENERATION." The entire content of U.S. patent application Ser. No. 13/766,201 by Heffner is incorporated herein by reference. More than one type of component 22 may be used.

In some examples, the output generated by component 22 may be quasi-random and non-deterministic, such that a key generated by controller 20 based on the output of component 22 may also be quasi-random and non-deterministic in some examples. The output of component 22 may also vary over time, e.g., as component 22 ages or otherwise changes physical configurations, as controller 20 selects different subcomponents of component 22 to generate the output, as the input provided by controller 20 to component 22 to generate the output varies, or any combination thereof. The variance in the output of component 22 over time may also help further obfuscate the key generated by controller 20 based on the output of component 22.

In some examples, the key generated by controller 20 based on the output generated by component 22 is an authentication key with which controller 20 may authenticate node 14 (e.g., to confirm node 14 is the intended hardware and that software executing on node 14 has not been copied, cloned, or hacked), authenticate node 12 to another node 14, or authenticate a message (e.g., authenticate trust for a communication signal or packet) received from another node 14. In addition, or instead, the key generated by controller may be an encryption key with which controller 20 may encrypt data to be transmitted to another node 14, decrypt data received from node 14, or any combination thereof. In this way, the node or message authentication or the encryption/decryption of data may be based on a function that is related to the physical configuration of component 22.

Node 12 may use the key generated by controller 20 based on the physics-based output of component 22 for any one or more anti-tamper applications, including, but not limited to, authentication of the hardware of first node 12, authentication of first node 12 to second node 14, authentication of second node 14 to first node 12, and encryption of data that is transmitted to second node 14, decryption of data received from second node 14, or any combination of these applications. Thus, the key generated based on a physics-based output of component 22 may have multi-purpose anti-tamper applications in some examples.

In some examples, the output of component 22 may change over time, such that controller 20 may generate different keys at different times, depending on the output of component 22 at the time the key is generated. In this way, the key with which controller 20 authenticates communications with another node 14 may be mutable. The mutability of the key with each instantiation of key generation may provide a basis for defining keys that are difficult to reverse engineer, e.g., by power analysis (as described in further detail below). The output of component 22 may change under the control of controller 20. For example, controller 20 may actively change the output of controller 22 by, for example, changing the subset of subcomponents of component 22 with which the output is generated. In other examples, the output of component 22 may change independently of the actions of controller 20. For example, the output of component 22 may change over time due to a change in physical characteristics of component 22 (e.g., due to aging).

In the case of a matched set of components including a plurality of gas-filled cells, the output from the components may continue to substantially match over time, despite a change in characteristics of the gas in the cells, because the gas in each of the matched sets may decay or otherwise change over time in a similar way, because the respective controller 22 may change the subset of subcomponents of component 22 with which the output, because the respective controller 22 may change the input to component 22, or any combination thereof.

In some examples, the output of component 22 is a discrete signal that only exists in real-time, e.g., as power is applied to component 22, such that the key generated by controller 20 based on the discrete signal may be relatively transient. The relatively transient nature of the key may also provide a basis for defining keys that are difficult to reverse engineer.

In some examples, controller 20 may not store the key in memory 26 of node 12 or a memory of another device. For example, the key may be a discrete signal that only exists in real-time while component 22 is active and generating the particular output with which controller 20 generates the key.

In other examples, however, controller 20 may store the key in memory 26 (or a memory of another device) for a relatively short period of time, such as on the order of nanoseconds or seconds (e.g., less than 10 seconds, such as less than 5 seconds). The period of time that the key is stored may be predetermined and selected based on, for example, the expected transmission time of a message from node 14 to node 12, which vary based on the size of the message (e.g., an electronic mail message), the distance the message travels, and the like. This may enable the transmission and authentication of the message to be completed before the key generated by controller 20 is automatically deleted by controller 20. For example, the period of time that the key is stored may be selected to be as long as it takes to route through the network (e.g., 1 minute). In this example, the period of time that the key is stored may vary based on the remoteness of node 12 relative to node 14 and the backlog in the server as packets are processed. Controller 20 may be configured to automatically delete the key after a predetermined amount of time, such that no key is permanently stored by node 12.

As discussed in further detail below, nodes 12, 14 of system may be configured to generate substantially the same key (e.g., the same or nearly the same) based on the physics-based outputs generate by the respective components 22, 42. In some examples, nodes 12, 14 are configured to generate substantially the same key at substantially the same time (e.g., the same or nearly the same). For example, components 22, 42 may be modified to behave similarly and components 22, 42 may be timed with each other, such that components 22, 42 generate substantially similar (e.g., identical or nearly identical) outputs at substantially similar times. These keys may be referred to as "time matched" in that they are generated based on the outputs of the respective components generated at substantially the same time.

Controller 20 may be configured store a particular key long enough to receive the time-matched key generated by node 14. In order to authenticate node 14, a message from node 14, encrypt data transmitted to node 14, or decrypt data received from node 14, or otherwise use the key, the key generated by controller 20 is time matched to a key generated by node 14. Controller 20 may store the key long enough to receive the time matched key generated by node 14 and to compare the keys. In other examples, the keys generated by nodes 12, 14 substantially match, independent of the time at which the keys are generated. Time matched keys are primarily referred to below for ease of description.

In some examples in which controller 20 stores a key generated based on the output of component 22, controller 20 may store a plurality of keys, e.g., in a registry of keys, with an indication of the time at which output of component 22 used to generate the respective key was generated. Such a registry of keys may be useful to time match a key with a key received from node 14. Node 12 may be configured such that the keys are only stored in the registry for a relatively short period of time, as discussed above.

In some examples, component 22 is an element of node 12 that is dedicated to generating the output used to generate the key. In other examples, component 22 is configured to provide a function in addition to generating the output used to generate the key. For example, component 22 may be a part of clock 24, communication module 28, or controller 20.

Figure 6:
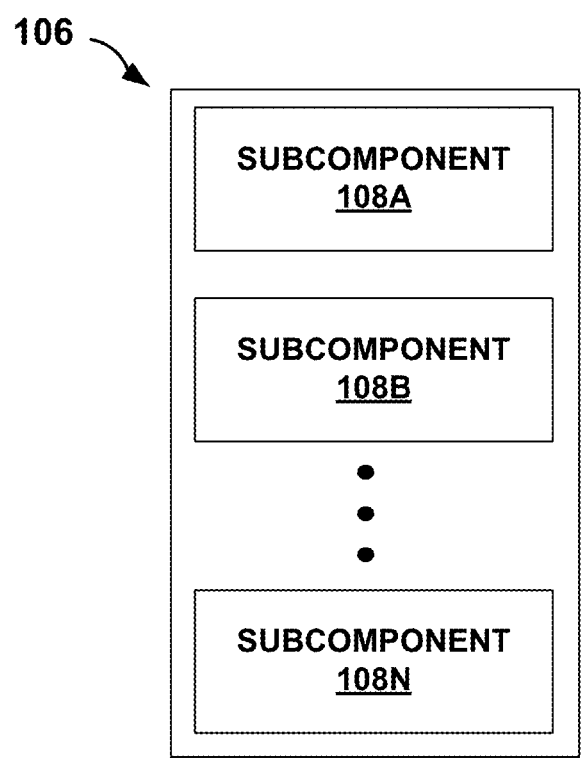
FIG. 6 is a conceptual illustration of an example component that includes a plurality of subcomponents that may each be configured to generate a physics-based output, which may individually or collectively generate the physics-based output of the component.

In some examples, as described in further detail with respect to FIG. 6, component 22 may include a plurality of subcomponents that are configured to cooperate to generate a detectable output of component 22. Component 22 may be configured in some examples such that controller 20 may generate a key based on the output from a subset of the subcomponents of controller 22, where the subset may include one sub-component, all the subcomponents, or some number of subcomponents less than all the subcomponents.

In some examples, node 12 includes a semiconductor die that includes component 22. The semiconductor die may be a part of a lot of die (e.g., formed from a common wafer) that are configured to generate substantially matching (e.g., matching or nearly matching) outputs at substantially the same time, where the outputs are unique to the die lot. For example, the chemical or mechanical configuration of the die may be modified until the die of the lot generate substantially matching outputs. In addition, or instead, a stimulant (e.g., a vibrational source) that renders matched keysets unique to the die lot may be deposited on the die as part of the manufacturing process. The semiconductor die may also include one or more additional elements of node 12, such as one or more of controller 20, clock 24, memory 26, and communications module 28.

The characteristics of component 22 that modulate the output generated by component 22 in response to a particular input or statically generated by component 22 may be difficult for an adversary to predict or measure from inspection of component 22. In addition, the physical configuration of component 22 may also be very difficult or even impossible to reproduce without access to manufacturing equipment similar to that used to fabricate and tune component 22. For example, in the case of component 22 including a plurality of gas cells, the gas in the cells may be unique to the batch of gas cells and the exact composition of the gas may be difficult, if not impossible, to reproduce at a later time.

Without detailed knowledge of the physical configuration of component 22 and, in the case of time-matched keys, the matching process for time-matching the output of component 22 to a component of another node, it may be relatively difficult for an adversary to produce counterfeit copies of component 22 that accurately reproduce the characteristics of component 22. Even with access to manufacturing equipment (e.g., lithographic masks, gas sources, and the like) used to fabricate component 22, an adversary may not have detailed knowledge of specific configuration processes used to create matched pairs of component 22.

In examples in which the output generated by component 22 changes over time, the key generated by controller 22 based on the output is transient. Due to the transient nature of the output generated by component 22 and the transient nature of the resulting key generated by controller 20 based on the physics-based output of component 22, the creation of a key by controller 20 and, as discussed in further detail below, the comparison of the key with a key received from the node to be authenticated, are timed with relatively high precision in order to enable time matching of keys with other nodes, such as second node 14.

Clock 24 is configured to generate a clock signal that is received by controller 20. Controller 20 may use the clock signal from clock 24 to coordinate the generation of a key from the output of component 22 with the generation of a key by other nodes of system 10, such as node 14, and the comparison of the keys. With the aid of clock 24, controller 20 may be configured to maintain a precise time-table for generating a unique key that has no permanence in network equipment. In some examples, a master clock located remotely, e.g., in a mainframe system housed in a closed ecosystem, may use its high precision timing to maintain fidelity between clock 24 and clocks of other nodes, such as clock 44 of node 14.

The timing for time-matching keys and comparing the time-matched keys in system 10 may be provided by various timing technologies from relatively low-precision technologies (e.g. oscillators) to relatively high-precision technologies (e.g. atomic clocks). Clock 24 may use any suitable clock technology, such as, but not limited to, one or more of an oscillator technology or atomic clock technology (e.g., chip-scale atomic clocks or cold-atom, atomic clocks). In some examples, clock 24 is an atomic clock and component 22 and clock 24 are provided by the same element, such that an atomic clock may be used alone or in conjunction with other components to generate a physics-based output based on which controller 20 generates a key.

In order to authenticate node 12 is the intended hardware, controller 20 may compare a key generated based on output from component 22 with data stored by memory 26 or another device (e.g., separate from node 12), or compare the key with a key generated based on the physics-based output of another component of node 12 that is configured to generate a physics-based output that substantially matches the output generated by component 22. In response to determining the key substantially matches the stored data or another key, controller 20 may confirm node 12 is the intended hardware and has not been tampered with. In response to determining the key does not substantially match the stored data, controller 20 may determine node 12 is not the intended hardware and may generate a tamper indication. The tamper indication may be a flag, value, or other indication stored by memory 26, a signal transmitted to another device in communication with node 12, or both.

In order to authenticate second node 14 (e.g., authenticate trust for communication, such as a signal or packet, sent by second node 14 and received by first node 12), controller 20 may compare a first key generated based on output from component 22 with a second key received from and generated by node 14. In response to determining the keys substantially match (e.g., match or nearly match), controller 20 may determine that node 14 is authenticated. In some examples, after authenticating node 14 based on the comparison of the first and second keys, controller 20 may begin or continue exchanging data with node 14 via communication channel 16. In some examples, controller 20 authenticates second node 14 prior to exchanging any data (e.g., receiving data from or transmitting data to) other than the key with node 14. In other examples, however, controller 20 may exchange data with second node 14 prior to or in parallel with authenticating node 14.

Memory 26 is configured to store data that may be used, e.g., by controller 20, to authenticate second node 14 during communication between first node 12 and second node 14. Memory 26 may include any volatile or non-volatile media, such as a RAM, ROM, non-volatile RAM (NVRAM), electrically erasable programmable ROM (EEPROM), flash memory, and the like. In some examples, memory 12 may be internal to controller 20. For example, memory 26 may be enclosed in a common housing as controller 20, on the same integrated circuit chip as controller 20, or both. In other examples, memory 26 may be external to controller 20, e.g., may be external to a package in which controller 20 is housed. For example, controller 20 may be defined by a semiconductor device (e.g., using a system-on-chip design methodology) or a plurality of semiconductor devices and may be housed in a common semiconductor package, and memory 26 may be external to that semiconductor package. In some of these examples, electrical signals transmit between memory 26 and controller 20 via one or more electrically conductive pathways (e.g., a data bus and address bus). In other examples, memory 26 and controller 20 may wirelessly communicate with each other.

Data stored by memory 26 can include, for example, critical program information for the operation of first node 12, protected intellectual property, and confidential information, such as classified information to which access is restricted by law or regulation to particular groups of persons. Authenticating second node 14 prior to receiving data from second node 14 or transmitting data to second node 14 may help reduce unauthorized technology transfer, may help protect any technological advantage provided to a particular entity from the knowledge and/or use of the stored data, and may help protect technological competitiveness afforded by the use of the stored data. Authenticating second node 14 using a physics-based output of component 22 may help minimize the possibility that node 12 may be reverse engineered by decreasing the accessibility to the contents of memory 26 through communications channel 16.

Communication module 28 is configured to support communication between first node 12 and another node of system 10 (e.g., second node 14) under the control of controller 20. Communication module 28 may accomplish communication with other nodes of system 10 using any suitable communication protocol, which may be a wired or wireless communication protocol.

In some examples, first node 12 comprises user interface 30, with which a user may interact with first node 12. User interface 30 may include, for example, a display, such as a liquid crystal display or light emitting diode display or other type of display screen, to present information to the user. In addition, user interface 30 may include an input mechanism to receive input from the user. The input mechanism may include, for example, one or more buttons, a keypad (e.g., an alphanumeric keypad), a peripheral pointing device, a touch screen display, or another input mechanism that allows the user to provide input.

In the example shown in FIG. 1, second node 14 comprises controller 40, component 42, clock 44, memory 46, communications module 48, and user interface 50. Controller 40, component 42, clock 44, memory 46, communications module 48, and user interface 50 may be similar (e.g., identical or nearly identical) to controller 20, component 22, clock 24, memory 26, communications module 28, and user interface 30, respectively, of node 12. Thus, the descriptions of controller 20, component 22, clock 24, memory 26, communications module 28, and user interface 30 apply to controller 40, component 42, clock 44, memory 46, communications module 48, and user interface 50, respectively, in some examples.

While two nodes 12, 14 are shown in FIG. 1, in other examples, system 10 includes a plurality of nodes similar to node 12, where the nodes are each configured to securely communicate with each other using the devices, systems, and techniques described herein.

Nodes 12, 14 of system 10 are configured to securely communicate with each other and, in some examples, other nodes in system 10, by at least authenticating its own hardware, authenticating the node with which information is being exchanged, authenticating a message received from the other node, e.g., prior to exchanging the information (e.g., prior to receiving information from the other node, transmitting information to the other node, or both) with the other node, or any combination thereof.

For example, software executed by node 12 may periodically authenticate its hardware based on the output of component 22, e.g., to confirm that software executed by controller 20 is running on the intended device and that the software has not been spoofed.

As another example, node 12 may authenticate node 14 to establish trust with node 14, e.g., by confirming that information is being exchanged with node 14 and not an adversary posing as node 14. Likewise, node 14 may authenticate node 12 to establish trust with node 12, e.g., to confirm that information is being exchanged with node 12 and not an adversary posing as node 12. As discussed in further detail below, in the example shown in FIG. 1, nodes 12, 14 are configured to authenticate each other prior based on physics-based keys generated based on the output from the respective components 22, 42. In this way, nodes 12, 14 are each configured to detect and exclude unauthorized communications based on physics-based keys.

Each of the nodes 12, 14 of system 10 includes component 22, 42, respectively, that is configured to generate a detectable physics-based output. Each controller 20, 40 is configured to detect the output from the respective component 22, 42, and generate a key based on the detected output. For ease of description, the key generated by controller 20 is referred to as a "first key" and the key generated by controller 40 is referred to as a "second key." The reference to "first" and "second" does impart any particular timing or other order to the keys.

A physical unclonable function (PUF) is a function that is embodied in a physical structure and unique to a component. The PUF may, in some cases, be used to identify a particular component. For example, component 22 may be associated with a particular output that may only be generated by component 22. In contrast to PUFs, the outputs generated by components 22, 42 with which the respective controllers 20, 40 generate a key may be substantially matched (e.g., at any time, within a particular range of time, or at substantially the same time). In this way, controllers 20, 40 are configured to generate substantially similar keys based on the outputs of different components 22, 42. The keys may be time-matched in some examples. In some examples, "substantially the same time" may indicate the same time or nearly the same time (e.g., within a second over a period of a month). In addition, "substantially similar" may mean identical or nearly identical and "time-matched" keys may refer to keys generated based on outputs generated by components 22, 42 at substantially the same time.

Nodes 12, 14 may be configured such that components 22, 42 generate substantially the same physics-based output using any suitable technique. For example, components 22, 42 may have substantially similar physical characteristics or at least be modified to behave similarly, such that components 22, 42 are configured to generate substantially similar outputs at any point in time or at a particular point in time. The substantially similar outputs may be achieved by modifying the physical characteristics of one or both components 22, 42 or other external factors that may affect the outputs. In this way, components 22, 42 of different nodes 12, 14 can be modified to behave similarly, such that the resultant keys generated by the respective controllers 20, 40 can be created from the component outputs are similar and may be compared in order to authenticate communications between nodes 12, 14.

In examples in which components 22, 42 comprise one or more subcomponents each including at least one gas cell, a light source, and a photodetector, the physical characteristics of components 22, 42 may depend on one or more factors, such as, but not limited to, the composition of the gas in the one or more gas cells of components 22, 42, the number and arrangement of the subcomponents relative to each other, the physical dimensions and characteristics of the gas cells, the wavelength and power of the light transmitted by the light sources of the subcomponents, external factors (e.g., temperature and humidity), or any combination thereof. Thus, in order to generate substantially matched outputs, components 22, 42 may include substantially similar subcomponents. If, for example, component 22 comprises an array of subcomponents, component 42 may include a substantially similar array of subcomponents having characteristics that match the array of subcomponents of component 22. For example, the gas cells may be manufactured on a wafer level, and at least some subcomponents of components 22, 42 may include gas cells formed from the wafer, such that they include substantially the same gas composition that modulates light transmitted through the gas cell in substantially the same way.

In addition to, or instead of, modifying the physical configuration of one or both components 22, 42, the input provided to components 22, 42 may be modified until components 22, 42 generate substantially the same output at substantially the same time. The inputs may differ depending on the type of component 22, 42 with which controllers 20, 40, respectively, generate the key. The inputs may be, for example, a vibratory input, an optical signal (e.g., a light having a particular wavelength), an electrical signal, creating a particular operating temperature for components 22, 42, and the like.

In some examples, the output of components 22, 42 may change over time, such that controllers 20, 40 may generate different keys at different times, depending on the output of the respective components 22, 42 with which the key is generated. In this way, the key with which controllers 20, 40 of nodes 12, 14 authenticate communications with the other node 14, 12 may be mutable. Moreover, in some examples, the outputs of components 22, 42 are discrete signals that only exist in real-time, such that the keys generated by controllers 20, 40 based on the discrete signals may be relatively transient and not stored in memories 26, 46, respectively, of or a memory of another device, or stored in memories 26, 46 for a relatively short period of time, as described above with respect to node 12.

Components 22, 42 are configured to generate substantially matching outputs. Thus, the first and second keys are generated by controllers 20, 40, respectively, based on outputs of components 22, 42 substantially match (e.g., are identical or nearly identical). As a result, 12, 14 are configured to generate substantially matched keys that can be used to authenticate communications between nodes 12, 14.

In some examples, the output generated by components 22, 42 remains substantially the same over time. In other examples, the output generated by components 22, 42 is transient, which results in transient keys that change based on the time at which controllers 20, 40 generate the keys. In this example, due to the transient nature of the resulting keys generated based on the physics-based outputs of components 22, 42, the creation and comparison of the keys generated from the components 22, 42 of respective nodes 12, 14 are timed with relatively high precision in order to time match the keys. The ability of nodes 12, 14 to properly authenticate communications with each other may depend on the timing of the generation and comparison of the keys. The output generated by components 22, 42 may change over time, such that the first and second keys may change, depending on the time at which respective controller 20, 40 generates the key. Thus, when the first and second keys are generated by controllers 20, 40, respectively, based on outputs of components 22, 42 generated at substantially the same time, the first and second keys substantially match (e.g., are identical or nearly identical). In order to authenticate communications between nodes 12, 14, clocks 24, 44 of nodes 12, 14, respectively, are substantially synchronized such that nodes 12, 14 are configured to generate time-matched keys. In some examples, clocks 24, 44 are configured to maintain substantially the same time and may only have a drift about one nanosecond per day relative to each other. Other precision standards may also be used.

Clocks 24, 44 of nodes 12, 14, respectively, may be substantially synchronized (synchronized or nearly synchronized) such that controllers 20, 40 may generate keys based on the output of the respective components 22, 42 generated by the components 22, 42 at substantially similar times in order to generate substantially similar time-matched keys. For example, clocks 24, 44 may help controllers 20, 40 determine which one or more outputs of component 22, 42, respectively, should be used to generate a key. In some examples, a master clock located remotely, e.g., in a mainframe of system 10, may use its relatively high precision timing to maintain fidelity between clocks 24, 44 of nodes 12, 14, respectively.

As an example of how controllers 20, 40 may use the respective clock 24, 44 to generate time-matched keys, controllers 20, 40 may use the respective clock 24, 44 to time the application of a stimulus by a stimulus source to the respective component 22, 42. With some types of components 22, 42, the timing of the stimulus may affect the output generated by the component 22, 42 at a particular time. In order to generate time-matched keys, controllers 20, 40 generate the keys based on the substantially similar outputs of the respective components 22, 42, which are generated by the components 22, 42 at substantially similar times. Thus, the timing of the stimuli applied to the component 22, 42 may affect the ability to generate time-matched keys in some examples.

Nodes 12, 14 may authenticate each other by at least comparing keys. In response to determining a key received from another node substantially matches (e.g., is identical to or nearly identical to) the key (e.g., a time-matched key) generated by the receiving controller 20 or 40, the receiving controller 20 or 40 may confirm the validity of the other from which the key was received (or the validity of the message), and, therefore, authenticate the other node (or message) from which the key was received. In some examples, keys may "substantially match" when the keys are substantially identical (e.g., identical or nearly identical).

In examples in which node 12 wants to communicate (e.g., exchange information) with node 14, controller 20 may authenticate node 14 by, for example, controlling communication module 28 to transmit a request (e.g., a signal) for a key to node 14 via communications channel 16. Controller 40 of node 12 may receive the request from node 12 via communications module 48. In response to receiving the request, controller 40 of second node 14 may generate a second key based on the output of component 42 generated by component 42 at time $T_2$. Under the control of controller 40, communication module 48 may transmit the second key to node 12 via communications channel 16. Controller 20 may receive the second key via communications module 28.

Controller 20 of first node 12 may generate a first key based on a physics-based output of component 22 generated by component 22 at time $T_1$. In a time-matched keys example, first time $T_1$ and second time $T_2$ at which components 22, 42, respectively, generated the outputs with which controllers 20, 40 generate the first and second keys, respectively, may be substantially the same. In some examples, controllers 20, 40 are configured to coordinate the generation of the keys based on the outputs of components 22, 42, respectively, generated at substantially the same time, such that the keys are time-matched. For example, controllers 20, 40 may be configured to generate the keys based on the outputs generated by the respective components 22, 42 at a specific time. Clocks 24, 44 of nodes 12, 14, respectively, may be synchronized such that when controller 20 generates the first key based on the output generated by component 22 at the specific time, controller 40 generates the second key based on the output generated by component 42 at that specific time. In this way, controllers 20, 40 may generate time-matched keys based on the output generated by the respective components 22, 42 at substantially the same time (e.g., the exact same time or as close to the same time as permitted by clocks 24, 44).

Controller 20 may authenticate second node 14 by at least comparing the first and second keys, which may be time-matched in some examples, but not others. In response to determining the first and second keys do not substantially match, controller 20 may determine second node 14 did not successfully authenticate itself, and may then stop any further exchange of information with second node 14. In some examples, controller 20 generates an indication in response to determining the first and second keys do not substantially match. The indication may indicate, for example, indication that there was a potential tampering with node 12, node 14, or that the communication between nodes 12, 14 was compromised. In some examples, the indication may be a flag, value, or other indication stored by memory 26 of node 12, a notification (e.g., signal) transmitted to another device in communication with node 12, or both. In addition, in some examples, controller 20 may destroy some or all information stored by memory 26 in response to determining node 14 improperly attempted to communicate with node 12.

On the other hand, in response to determining the first and second keys substantially match, controller 20 may confirm the validity of second node 14 (e.g., validate the hardware of node 14), and, therefore, authenticate second node 14. In this way, first node 12 may authenticate second node 14 based on a physics-based key by comparing the authentication key transmitted by the second node with the authentication key generated by the first node, and without relying on an authentication key stored in memory 26. After authenticating second node 14, controller 20 may exchange information with second node 14.

In some examples, first node 12 may implement the technique described above to authenticate specific messages transmitted from node 14, rather than authenticating node 14. The physics-based keys described herein may be used to authenticate another node or a specific message transmitted by another node.

In some examples, two-way authentication is performed before nodes 12, 14 may exchange information (other than keys) with each other. For example, prior to exchanging information (other than keys), node 12 may authenticate node 14 using the technique described above, and node 14 may likewise authenticate node 12 using a similar technique. For example, controller 40 may authenticate first node 12 by, for example, controlling communication module 48 to transmit a request (e.g., a signal) for a key to node 12 via communications channel 16. Controller 20 of node 12 may receive the request from node 12 via communications module 28. In response to receiving the request, controller 20 of first node 12 may transmit the first key to second node 14 via the respective communication modules 28, 48. Controller 40 of second node 14 may receive the first key from node 12 and may authenticate first node 12 by at least comparing the first and second keys. In response to determining the first and second keys substantially match, controller 40 may confirm the validity of first node 12, and, therefore, authenticate node 12. After authenticating node 12, controller 40 may exchange information with node 12.

In some examples, controllers 20, 40 may be configured to generate respective physics-based keys at specific time intervals. Communications received by nodes 12, 14 during a particular time interval may then be authenticated based on the physics-based keys associated with the time interval. A node 12 or 14 may transmit a physics-based key with a communication, where the physics-based key is associated with the time interval in which the communication is being sent by the node, and the receiving node 14 or 12 may authenticate the communication based on the received physics-based key and the physics-based key generated by the receiving node and associated with the time interval.

In some examples, outputs from components 22, 42 with which controllers 20, 40, respectively, generate the first and second keys are discrete signals that only exists in real-time while the components 22, 42 are active and generating the particular outputs. Controllers 20, 40 may regenerate the first and second keys, respectively, periodically, e.g., as the output of the components 22, 42 change, such that the keys may only be used to authenticate communications between nodes 12, 14 during a particular time period. Thus, in some examples, a particular set of time-matched first and second keys may only be used to authenticate communications (or encrypt/decrypt data) for a particular time period. The time period may have a predetermined duration in some examples, and, in other examples, may not be predetermined. Moreover, the time period during which controllers 20, 40 may authenticate the other node 14, 12, respectively, based on a particular key may vary, depending on the frequency with which controllers 20, 42 regenerate the keys.

In some examples, one or more nodes of system 10 may include one or more router, and the one or more routers may be configured to help ensure the keys are transmitted between nodes 12, 14 within a timeframe that will permit matching and authentication of the keys.

The devices, systems, and techniques described herein that uses cryptographic technology that produces unique, complex keys derived from physics-based sources may help minimize or even eliminate the possibility that the keys may be obtained by an adversary. For example, components 22, 42 are difficult to physically copy. Even if the physical structure of components 22, 42 is determined, configuring each of the components 22, 42 to generate an output that substantially matches and, therefore, spoofs, the output of component 22, 42, respectively, may be relatively difficult or even impossible. For example, due to variations in the manufacturing process, the output of components 22, 42 may be unique to components 22, 42, respectively. As an example, in examples in which components 22, 42 each include one or more subcomponents including one or more gas cells that modulates one or more properties of light transmitted through the gas, the composition of the gas may be unique to the batch in which the subcomponents were manufactured. Because the exact gas composition may be difficult to reproduce, components 22, 42 may be difficult to physically copy.

As another example of how cryptographic technology that produces unique, complex keys derived from physics-based sources may help minimize or even eliminate the possibility that the keys may be obtained by an adversary, the keys may be transient in nature and not stored in a memory or stored in memory for a relatively short period of time, thereby eliminating one channel through which an adversary may obtain the keys. Even if the keys are stored in a memory, the keys change over time, such that the possibility that the keys may be obtained by an adversary in time for the adversary to use the keys to gain unauthorized access to other information from nodes 12, 14 may be reduced. In addition, the transient nature of the outputs generated by components 22, 42 may help prevent spoofing of the physics-based keys by an adversary.

System 10 including nodes 12, 14 that use concurrent physics-based signal generation and precise timing technology to authenticate communications and, in some examples, encrypt/decrypt data, may help reduce the vulnerabilities of system 10 to reverse engineering or other attacks that may compromise the security of nodes 12, 14. An adversary may attempt to gain access to the secure communications between nodes 12, 14 through one or more means, including accessing authentication or encryption keys resident or re-assembled in one or both of nodes 12, 14, or by determining an authentication or encryption key through a side channel attack, such as simple power analysis, differential power analysis, correlation power analysis, and a template attack. In some cases, key generation techniques described herein that use a physics-based output of a component may help mitigate electronic tampering from side channel attacks and through access the authentication or encryption keys. For example, the transient existence of the first and second keys generated by nodes 12, 14 for authentication, encryption, or both, may help combat power analysis techniques. A side channel attack may be, for example, an attack on system 10 based on information that is obtained from an analysis of the physical operation of system 10, such as the power consumed by system 10 during its operation and/or the sounds generated by system 10 during its operation.

Simple power analysis is a side channel attack which involves visual examination of the power consumption (e.g., the current used) of an electrical device (e.g., node 12 or node 14) over time in order to determine by statistics-based simple power analysis, an encryption or authentication key used by the device. The electrical device may consume different amounts of power consumption as it performs different operations, such that variations in power consumption over time may evidence the different operations of the device. If the device is a cryptographic system that encrypts stored data, an adversary may be able to extract encryption keys from the power consumption profiles. Within some cryptographic systems, the unique power profiles may alert the adversary to the cryptographic standard being used. For example, systems that encrypt data using the Data Encryption Standard (DES) use 16 rounds, which are 16 identical stages of processing (e.g., transforming) used to convert plain data into ciphered data. These rounds can easily be seen on a digital oscilloscope and may tip off the adversary to the implementation of the DES to encrypt the stored data. As another example, systems that encrypt data using the Advanced Encryption Standard (AES) may use 10, 12, or 14 rounds to convert plain data into ciphered data, depending on the selected key strength. The unique, complex keys derived from physics-based sources described herein may help reduce the possibility that an adversary may determine the key via a side channel attack.

As discussed above, the outputs generated by components 22, 42 may be a function of the physical configuration of the respective components 22, 42. Thus, as the physical characteristics of components 22, 42 change (e.g., due physical tampering), so may the keys generated by controllers 20, 40 based on the output of the respective component 22, 42. Physical tampering with nodes 12, 14 may incidentally or purposefully change the physical structure of components 22, 42. For example, an adversary may attempt to examine node 12, such as by opening a housing of node 12 (in which components of node 12 are positioned) or by physically destructing the housing. During the physical tampering with the housing, the physical characteristics of component 22 may change, which may change the output generated by component 22. If second node 14 is not tampered with in an identical manner, then controllers 20, 40 of first and second nodes 12, 14, respectively, may generate different keys (e.g., different time-matched keys). As a result, controller 40 of second node 14 may be unable to match the second key generated by controller 40 with a first key generated by controller 20 of first node 12, and, therefore, may not authenticate first node 12 (or successfully encrypt or decrypt data). In response to determining the first and second keys do not match, controller 40 may prohibit further communication between node 14 and node 12 (e.g., by prohibiting further receipt of data from node 12 or transmission of data to node 12). In this way, the sensitivity of component 22, as well as component 42, to physical changes may help safeguard the contents of memory 26, 46, respectively, or other information stored by the nodes 12, 14, respectively. In addition, in this way, nodes 12, 14 may be self-protecting, and may inherently include an active volume barrier that helps prevent successful tampering with nodes 12, 14.

The elements of system 10 and nodes 12, 14 shown in FIG. 1 are merely one example. In other example, system 10, first node 12, and second node 14 may have a different configuration, such as a fewer or a greater number of elements. For example, although controller 20 and clock 24 are described as separate modules, in some examples, the functionality of clock 24 may be integrated into controller 20. Similarly, in some examples, the functionality of clock 44 may be integrated into controller 40 of second node 14 in some examples. As another example, although not shown in FIG. 1, in some examples, nodes 12, 14 may each include a power source configured to deliver operating power to the respective node 12, 14. The power source may include, for example a battery and a power generation circuit. In other examples, nodes 12, 14 may receive power from an external power source.

As another example, in some examples, an electromagnetic interference (EMI) shield is formed over component 22, component 42, or both. The EMI shield may block EM radiation generated by the output (e.g., analog electrical signals) generated by component 22 or 42 from propagating to an exterior of the EMI shield. This may prevent a reverse engineer from measuring the EM radiation in an attempt to reverse engineer the output generated by component 22 or 42. The EMI shield may include, for example, an electrically conductive or magnetic material, and may be formed as a substantially continuous layer (e.g., continuous or nearly continuous), a screen, a metal foam, a layer of electrically conductive ink, or the like on a surface of the component 22 or 42.

The EMI shield may be configured to generate an output in response to an input (e.g., a magnetic field) applied by controller 20. The output generated by the EMI shield may remain substantially constant over time, unless the EMI shield is damaged, e.g., physically damaged during a tamper event in which an adversary may attempt to view component 22. In this way, the EMI shield may be configured to provide an output indicative of a health (e.g., tamper or no-tamper) condition of component 22 or 42. Controller 20 or 40 may periodically apply the input to the EMI shield and determine a health state of component 22 or 42, respectively, based on the output generated by the EMI shield in response to the applied input. In response to determining the output generated by the EMI shield substantially matches a stored output (e.g., stored by memory 26 or 46 or another memory), controller 20 or 40 may determine that the EMI shield is substantially intact. In response to determining the output generated by the EMI shield does not substantially match a stored output (e.g., stored by memory 26 or 46 or another memory), controller 20 or 40 may determine that the EMI shield has been tampered with. In response, controller 20, 40 may take a responsive action, such as deleting data stored by memory 26, generating an indication, or both.

The physics-based output of component 22 (or 42) is a secret on the device, which is difficult, if not impossible for an adversary to obtain or duplicate. Thus, the physics-based output may be useful for authenticating hardware of a device, such as node 12 or node 14.

Figure 2:
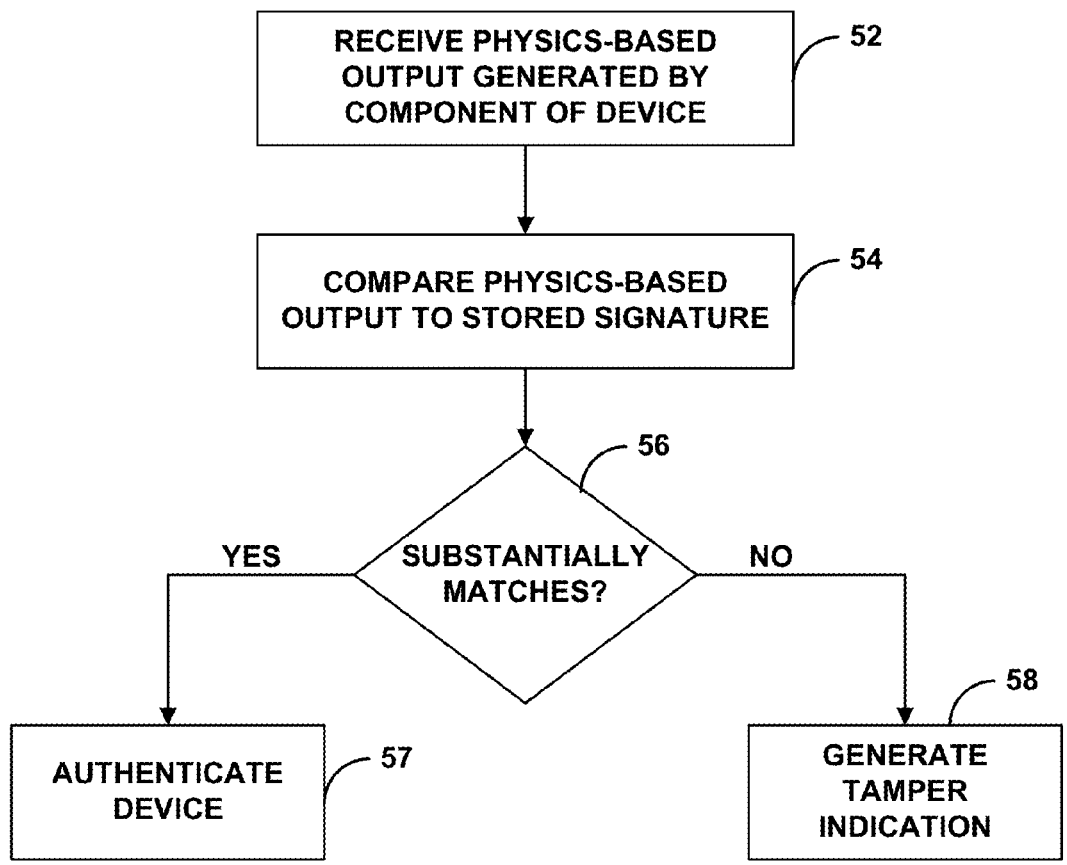
FIG. 2 is a flow diagram of an example technique that may be implemented by a node to authenticate hardware of the node based on a physics-based output of a component.

FIG. 2 is a flow diagram of an example technique for authenticating hardware of a device based on a physics-based key, which is generated based on the physics-based output of a component configured to generate an output unique to the physical configuration of the component. While the technique shown in FIG. 2 is described with respect to first node 12, in other examples, second node 14 or another node of system 10 may implement the technique shown in FIG. 2 to authenticate its own hardware. In addition, the technique shown in FIG. 2 is described with respect to an atomic component, which includes a plurality of subcomponents each including a gas cell, a light source configured to emit a light, and a photodetector configured to sense the light emitted by the light source and transmitted through the gas in the cell. In other examples, other types of components configured to generate a physics-based output may be used in addition to or instead of the atomic component.

In the technique shown in FIG. 2, controller 20 receives a physics-based output generated by component 22 (52). The physics-based output may be, for example, an electrical signal that is based on the electrical signals generated by the photodetectors of the subcomponents of component 22. Controller 20 compares the physics-based output to a stored signature (54), which may be stored by memory 26 or a memory of another device separate from node 12. In some examples, the stored signature is a template signal, a value (e.g., a threshold value or a waveform amplitude value), or any other suitable characteristic of a physics-based output of component 22 that can be predetermined and is indicative of a baseline state of node 12. The baseline state may be, for example, a state in which node 12 is known to be in an untampered state in which an adversary has not attempted to access node 12 or otherwise disturbed the output of component 22.

In some examples, controller 20 determines a key based on the physics-based output generated by component 22, e.g., using a technique described below with respect to FIG. 4, and determining whether the physics-based output generated by component 22 substantially matches the stored signature includes comparing the key to the stored signature, which may be a stored key (56). Controller 20 may determine whether the key generated based on the physics-based output generated by component 22 substantially matches the stored key using any suitable technique. In one example, both the key generated by controller 20 based on an output generated by component 22 and the stored key define a plurality of bits in a sequence (e.g., a sequence of 64 bits, 128 bits, 256 bits, or 512 bits) and controller 20 compares the key with the stored key on a bit-by-bit basis.

Controller 20 may, for example, determine the keys match in response to determining each bit of the key matches a corresponding bit of the stored key, or a threshold percentage (e.g., 95% or greater) of bits of the keys match. In other examples, controller 20 may compare the keys using an algorithmic function and values derived from bit streams of the keys. Controller 20 may, for example, determine the key generated by controller 20 based on an output generated by component 22 and the stored key substantially match in response to determining the outputs of the algorithmic function (to which the values derived from the bit streams of the keys were inputs) substantially match (e.g., matches or is within a threshold range of each other, such as 1% of each other).

In response to determining the physics-based output generated by component 22 substantially matches the stored signature ("YES" branch of block 56), controller 20 authenticates the hardware of node 12 (57), e.g., confirms that the software of node 12 is executing on the intended hardware and has not been spoofed, copied, or hacked. In response to determining the physics-based output generated by component 22 does not substantially match the stored signature ("NO" branch of block 56), controller 20 determines at least some hardware of node 12 is not the intended hardware and, in the example shown in FIG. 2, generates a tamper indication (58). The tamper indication may be a flag, value, or other indication stored by memory 26, a signal transmitted to another device in communication with node 12, or both.

In other examples of the technique shown in FIG. 2, instead of comparing the physics-based output generated by component 22 (or a key generated based on the output) to a stored signature, controller 20 authenticates the hardware of node 12 by at least comparing the physics-based output generated by component 22 (or a key generated based on the output) to the physics-based output generated by another component of node 12 (or a key generated based on the output). Node 12 can include at least two components configured to generate substantially similar physics-based outputs, and controller 20 can authenticate the hardware of node 12 based on the outputs of the at least two components.

Figure 3:
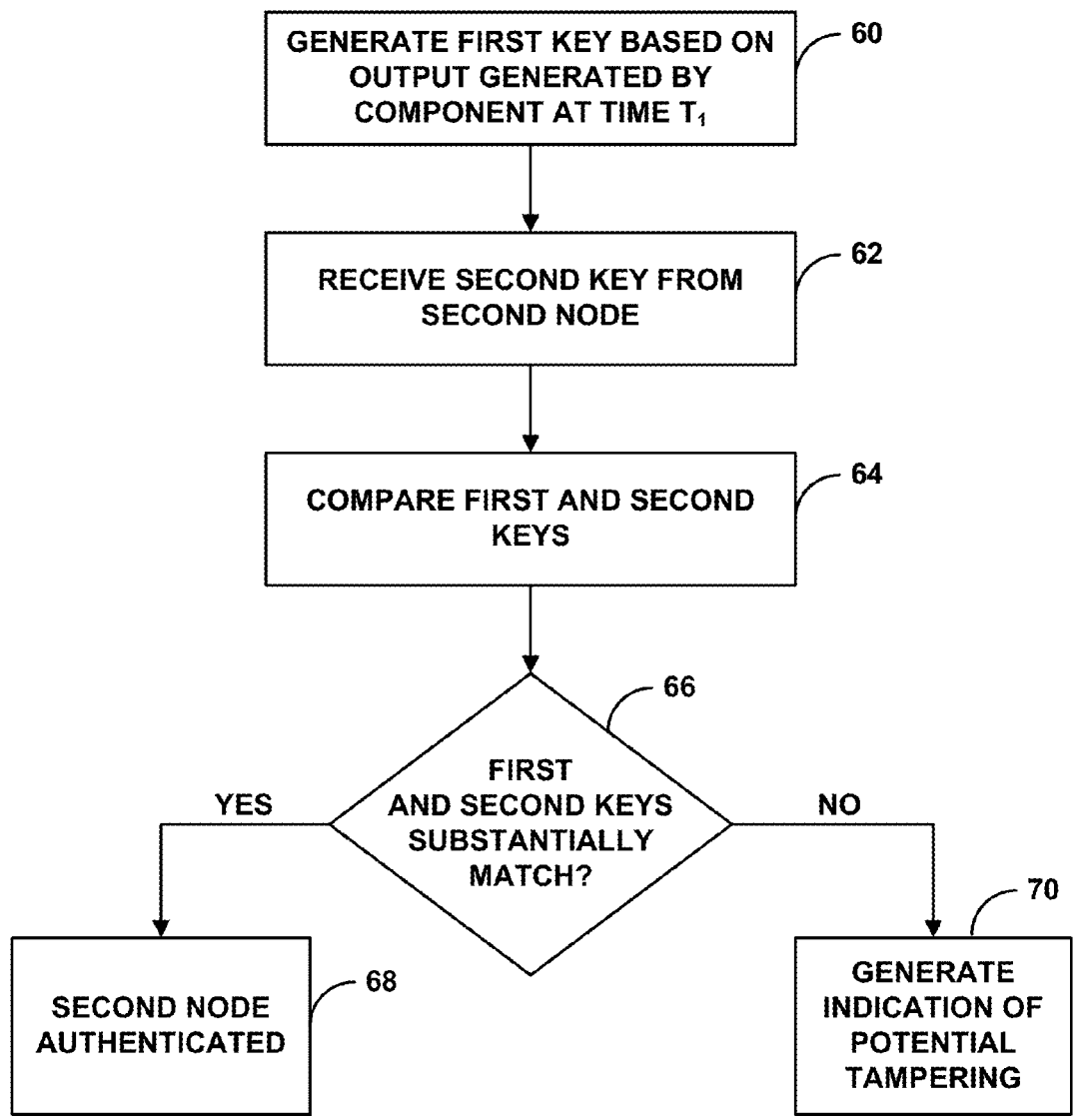
FIG. 3 is a flow diagram of an example technique that may be implemented by a node to authenticate another node.

As previously indicated, the physics-based output generated by components 22, 42 can be used in some examples to authenticate and secure communications between nodes 12, 14. FIG. 3 is a flow diagram of an example technique for authenticating a node based on a physics-based key. While the technique shown in FIG. 3 is described with respect to first node 12 authenticating second node 14, in other examples, first node 12 may authenticate another node using the technique shown in FIG. 3, or second node 14 or another node of system 10 may implement the technique shown in FIG. 3 to authenticate first node 12 or another node. In some examples, the technique shown in FIG. 3 may be implemented by first node 12 prior to, for example, transmitting data to second node 14, receiving data from second node 14, or both.

In the technique shown in FIG. 3, controller 20 generates a first key based on an output generated by component 22 at time $T_1$ (60). Controller 20 may also receive a second key from second node 14 (62), where the second key is generated by controller 40 of second node 14 based on an output generated by component 42 of second node 14 at time $T_2$. Times time $T_1$ and $T_2$ are substantially the same (e.g., the same or nearly the same) in some examples, such that the first and second keys are time-matched. Controllers 20, 40 may be configured, e.g., based on the synchronization of clocks 24, 44, to generate the respective first and second keys based on outputs generated by components 22, 42 at substantially the same time. In some examples, controllers 20, 40 are configured to generate the respective first and second keys at predetermined times, such as at a predetermined frequency. In other examples, the first and second keys may not need to be time-matched in order to authenticate node 14.

In some examples, controller 20 requests the second key from second node 14. Controller 20 may request the second key from second node 14 using any suitable technique, such as by controlling communication module 28 to transmit a request (e.g., a signal) for a key to node 14 via communications channel 16. In response to receiving the request via communications module 48, controller 40 may transmit the second key to first node 12 via communications channel 16.

In other examples, rather than requesting the second key from second node 14, controller 40 of second node 14 may be configured to automatically transmit the second key to first node 12 at the predetermined times, such as at predetermined intervals, which may coincide with predetermined time intervals at which controllers 20, 40 generate keys. Likewise, in some examples, controller 20 of first node 12 may be configured to automatically transmit the first key to second node 14 at the predetermined times, such as at predetermined intervals, which may coincide with predetermined time intervals at which controllers 20, 40 generate keys. In some examples, a particular time interval may be associated with the most recent (in time) set of time-matched keys generated by nodes 12, 14. Communications received by node 12 during a particular time interval may then be authenticated based on the physics-based keys associated with the time interval.

The order of blocks shown in FIG. 3 may, though need not always, impart an order to the technique. For example, in some examples, controller 20 may receive the second key from second node 14 (62) at substantially the same time as or prior to generating the first key (60).

Controller 20 compares the first and second keys, which may be time-matched in some examples (64). Controller 20 may compare the first and second keys to authenticate communication from node 12 (e.g., a packet) that is sent or received within a time period associated with the keys. For example, controller 20 may be configured such that the first and second keys may only be valid for authenticating a message received within a predetermined time window starting from time $T_1$ at which component 22 generated the output with which controller 20 generated the first key. The predetermined time window may have a duration that is based on, for example, the period of time that controller 20 stores the first key. As discussed above, such a period of time may be predetermined and selected based on, for example, the expected transmission time of a message from node 14 to node 12.

Controller 20 may determine whether the first and second keys substantially match using any suitable technique. In one example, for each of the first and second keys, controller 20 identifies the bits in a sequence (e.g., a sequence of 64 bits, 128 bits, 256 bits, or 512 bits) that is being used as the key and compares the keys on a bit-by-bit basis. Controller 20 can determine the keys match in response to determining each bit of the first key matches a corresponding bit of the second key, or a threshold percentage (e.g., 95% or greater) of bits of the first and second keys match. In other examples, controller 20 may compare the keys using an algorithmic function and values derived from bit streams of the first and second keys. Controller 20 may, for example, determine the first and second keys match in response to determining the outputs of the algorithmic function (to which the values derived from the bit streams of the first and second keys were inputs) substantially match (e.g., matches or is within a threshold range of each other, such as 1% of each other).

In response to determining the first and second keys substantially match ("YES" branch of block 66), controller 20 may authenticate second node 14 (66). On the other hand, in response to determining the first and second keys do not substantially match ("NO" branch of block 66), controller 20 may generate an indication (70). The indication may indicate, for example, indication that there was a potential tampering with node 12, node 14, or that the communication between nodes 12, 14 was compromised. In some examples, the indication may be a flag, value, or other indication stored by memory 26 of node 12, a notification (e.g., signal) transmitted to another device in communication with node 12, or both.

Controller 20 may be configured to concurrently compare any number of keys, e.g., to authenticate more than one other node of system 10 at substantially the same time.

FIGS. 1-3, as well as other description herein, may refer to the generation of a key based on the output of component 22 or 42. The "output" of the component 22, 42 with which controllers 20, 40, respectively, generate the respective keys may include a plurality of outputs generated over a period of time.

In addition to, or instead of, authenticating another node or message received from another node using time-matched keys, controllers 20, 40 may each encrypt or decrypt data using physics-based keys, which may be time-matched in some examples. For example, controller 20 may encrypt data using a first key generated based on an output of component 22, and control communications module 28 to transmit the data to node 14. Controller 40 may receive the encrypted data from node 12 via communications module 48. Controller 40 may decrypt the data using a second key generated based on a physics-based output of component 42, which substantially matches the physics-based output of component 22 with which controller 20 encrypted the data. In some examples in which controllers 20, 40 generate keys at predetermined time intervals based on outputs of components 22, 42 generated at the predetermined time intervals, a particular time interval may be associated with the most recent (in time) set of time-matched keys generated by nodes 12, 14. Communications received by node 12 during a particular time interval may then be decrypted based on the physics-based keys associated with the time interval, communications transmitted by node 12 to node 14 during a particular time interval may then be encrypted based on the physics-based keys associated with the time interval, or both.

Figure 4:
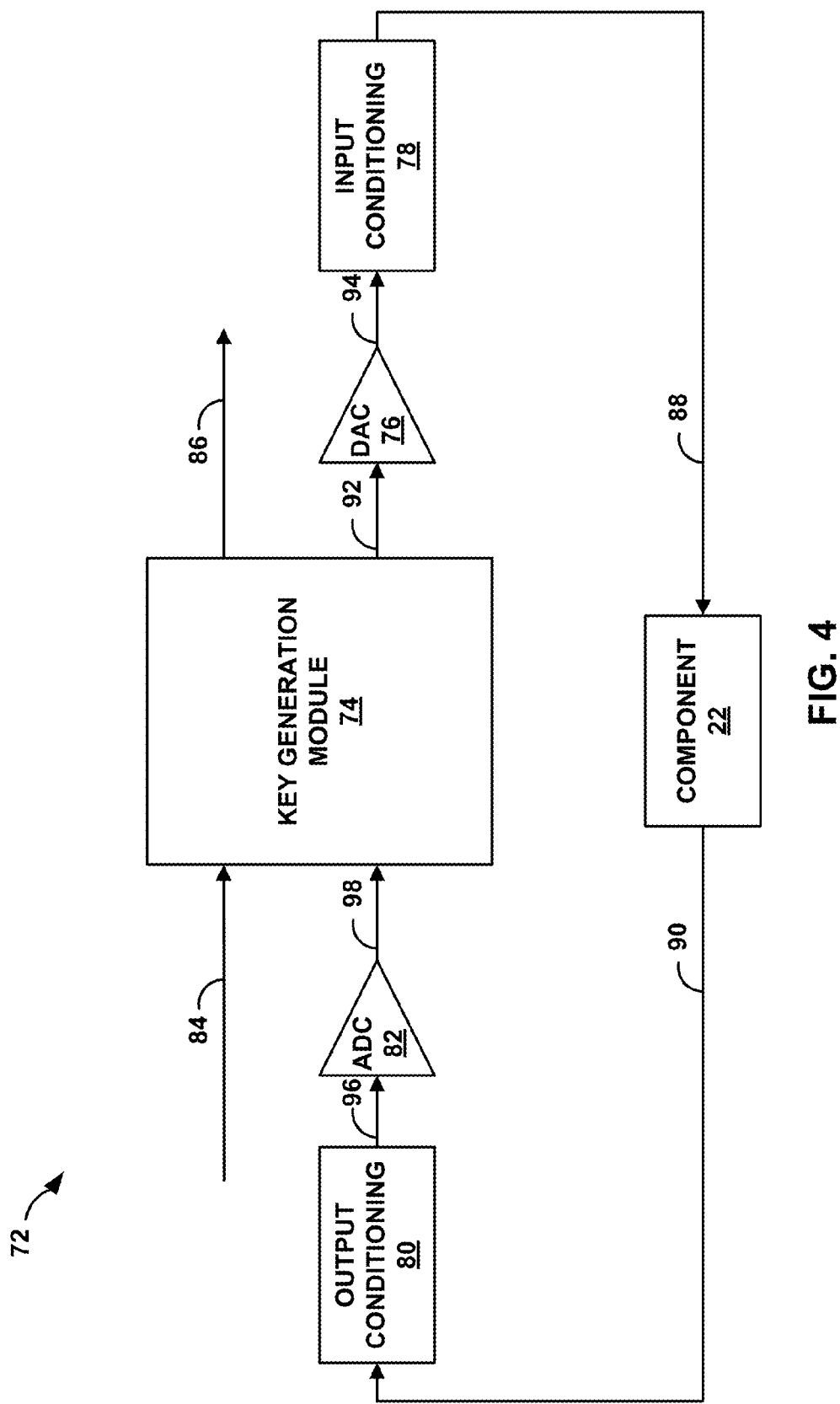
FIG. 4 is a block diagram illustrating an example circuit for generating an example physics-based key based on a physics-based output of a component.

FIG. 4 is a functional block diagram illustrating an example circuit 72 configured to generate a key based on a physics-based output of a component. For ease of description, circuit 72 is described with respect to controller 20 of first node 12 and elements of first node 12. In other examples, another node, such as second node 14, may include circuit 72 in addition to or instead of first node 12.

In the example shown in FIG. 4, circuit 72 includes component 22, key generation module 74, digital-to-analog converter (DAC) 76, input conditioning module 78, output conditioning module 80, and analog-to-digital converter (ADC) 82. In some examples, controller 20 may include some or all of the elements of circuit 72, such as, but not limited to, key generation module 74, DAC 76, input conditioning module 78, filter 80, and ADC 82. Key generation module 74 is configured to receive input 84 and generate, as an output, key 86. Key 86 may, for example, authenticate the hardware of node 12, authenticate another node (e.g., from which communication is received by node 12), authenticate trust of node 12 to another node, authenticate a message received from another node, encrypt or decrypt data, or any combination thereof.

Key generation module 74 may be implemented by hardware, software, firmware or any combination thereof. In some examples, key 86 and input 98 are substantially the same (e.g., the same or nearly the same). In other examples, such as the example shown in FIG. 4, key generation module 74 is configured to transform input 98, which is based on output 90 generated by component 22, to generate key 86. Key generation module 74 may implement any suitable transformation algorithm (e.g., a transformation function) that results in a unique value. The transformation algorithm can be selected such that there is one-to-one mapping of input value (e.g., input 98) to output value (e.g., key 86), and such that there is no aliasing (e.g., such that two or more input values do not result in the same output value). For example, in examples in which component 22 includes a plurality of subcomponents each including at least one gas cell, a light source, and a photodetector, the output generated by each subcomponent may be used to determine a respective bit in an outputted key 86.

In some examples, the transformation algorithm is non-linear, and in these examples, no proportional relationship exists between the value input to the transformation algorithm and the value output from the algorithm. Using these parameters and other parameters, the selected transformation algorithm may be selected such that it is resistant to linear and differential cryptanalysis, as well as algebraic attacks. An example of a non-linear transformation algorithm that key generation module 74 may implement to transform key 86 includes a Substitution-box (also referred to as an "S-box"), which performs substitutions between an input and an output. In some examples, the Substitution-box is a look-up table that associates an input 98 with a transformed value, which may then be used as key 86. Instead of, or in addition to, the Substitution-box, in some examples, key generation module 74 may transform input 98 using an independent cryptographic algorithm, such as using AES, RC5, or DES algorithms, or any combination thereof. However, the transformation algorithm implemented by key generation module 74 to transform a unique input 98 to a transformed value is not necessarily cryptographic in all examples.

Key generation module 74 is configured to output a transformed value, which results when the unique input 98 based on a particular output 90 of component 22 undergoes the transformation. In some examples, the transformed value output by key generation module 74 is key 86, which may be used for authentication, encryption/decryption, or both. In some examples, the transformed value is combined with a master key using any suitable combination function (e.g., a bitwise XOR function, non-linear function, a hash function, a cryptographic function, a look-up table, and the like), and the result of this combination is used by controller 20 as the key.

In examples in which the output of component 22 varies over time (either due to the nature of the physics-based output of component 22 or under the control of a controller), controller 20 may implement a different function to generate key 86, depending on the time at which the output 90 used by key generation module 74 to generate key 86 is generated by component 22. In this example, because the output of component 22 changes over time, even if one key is cracked and a master key (if used by key generation module 74 to generate the key) is determined, key generation module 74 implements different input values 90 to generate the key based on the time at which the key is generated. Accordingly, even if an adversary gains knowledge of a particular key, the key may be outdated in a matter of time (e.g., on the order of seconds), such that the adversary may not use the key to tamper with system 10 or gain access to information of node 12 or another node of system 10. For at least these reasons, a key that is generated based on the output of a physics-based output of component 22 that changes over time may provide a cryptographically secure authentication or encryption technique.

In the example shown in FIG. 4, input 84 to key generation module 74 may be, for example, a signal from controller 20 that causes key generation module 74 to generate key 86 based on an output 90 of component 22. In addition or instead, input 84 to key generation module 74 may be a clock signal generated by clock 24. In some examples, key generation module 74 is configured to generate key 86 based on the output 90 generated by component 22 at a particular time indicated by the clock signal or at the time the input signal 84 is received.

In some examples, component 22 is configured to generate an output 90 in response to an input 88. Input 88 may be, for example, one or more stimuli applied to component 22, e.g., by input conditioning module 78, power applied to component 22, one or more optical signals applied to component 22, or another one or more input signals configured to evoke a detectable output from component 22. In addition, or instead, in some examples in which component 22 includes a plurality of subcomponents configured to generate output 90 individually or collectively, input 88 received by component 22 may indicate which subcomponents of component 22 are selected to generate the output 90. Component 22 may be configured such that a subset of the subcomponents is selectable, e.g., by controller 20, to generate output 90 with which key generation module 74 generates a key. Example components with a plurality of selectable subcomponents are described in further detail below with respect to FIGS. 6-8.

In the example shown in FIG. 4, key generation module 74 is configured to transmit data on DAC control bus 92; DAC 76 is configured to convert the data to analog output signal 94. Analog output signal 94 may be used to drive input conditioning module 78. Input conditioning module 78 is configured to generate input 88 to component 22, where input 88 may drive the generation of output by component 22. In some examples, input conditioning module 78 includes an electrical circuit, a mechanical device (e.g., a vibrator), a light source, or any other suitable element or combination of elements configured to generate a stimulus signal, which is provided as input 88 to component 22. The stimulus signal may drive component 22 to generate output 90. The type of input conditioning module 78 may be selected on the type of component 22.

In some examples, input conditioning module 78 also includes one or more elements configured to modify the stimulus. For example, in some examples in which component 22 comprises an optical component (e.g., component 120 described with respect to FIG. 7), input conditioning module 78 can include a filter, an element configured to generate an electromagnetic field or heat (to create a thermal change), or any other element configured to help change one or more properties of the light emitted by a light source or the external factors that may affect the output of the optical component.

In some cases, different components 22, even if they originate from the same lot, may react differently to different inputs 88, and, therefore, generate different outputs in response to the same input 88. Controller 20 may modify the output of component 22 by at least modifying input 88 applied to the component 90 to evoke the physics-based output 90. Thus, in some examples, component 22 of node 12 and component 42 of second node 14 may generate substantially similar physics-based outputs, but may generate the particular output in response to different inputs (e.g., stimuli).

An output of a particular component 22 may also be changed by modifying the physical configuration of component 22, such as by modifying the geometry of component 22, or, in the case of an array of gas cells, the composition of the gas in the cells or the number, type or arrangement of gas filled cells. Any of the techniques described above for modifying the physics-based output of a particular component 22, e.g., in order to match the output to the output of another component 22, may be used alone or in combination with each other.

In the example shown in FIG. 4, component 22 is configured to generate an analog output 90, which may be, for example, a waveform (e.g., an analog electrical signal) or a particle (e.g., a localized object having measurable physical or chemical properties). Output conditioning module 80 is configured to receive analog output 90 from component 22 and perform a filtering operation on component output 90 in order to generate filter output 96. Output conditioning module 80 may, for example, be configured to reduce background noise present in the output 90. In some examples, Output conditioning module 80 may be a band-pass filter, a low-pass filter, a high-pass filter, a band-stop filter, a notch filter, a comb filter, or another suitable filter. The configuration of output conditioning module 80 may be selected based on the noise expected to be present in the output from component 20 or other suitable parameters.

Conditioned output 96 may be, for example, an analog signal that is input to ADC 82 to generate digital output signal 98. Key generation module 74 is configured to receive digital output signal 98 from ADC 82 and generate key 86 based on digital output signal 98, which is indicative of a physics-based output generated by component 20, and, in some examples, indicative of a physics-based output generated by component 20 at a particular time. From the information in digital output signal 98, key generation module 74 may generate a physics-based key.

In some examples, controller 20 (e.g., key generation module 74 of controller 20) may implement control algorithms such that circuit 72 may only be accessed through input data 84 and output data 86 using software or hardware that follows secure protocols. In some examples, key generation module 74 may be configured to implement functional modules that perform processing steps on incoming and outgoing data. The modules may include, for example, security modules that configure key generation module 74 to implement security features, such as hash functions or encryption functions on input data 84 and output data 86. For example, key generation module 74 may incorporate or append AES data to messages on output data 86 to increase the security of data transmitted by key generation module 74. In addition, or instead, key generation module 74 may be configured to generate a key 86 based on input 84 that includes AES data. In some examples in which portions of the security modules of key generation module 74 are implemented in software code, the software code may be periodically updated to increase the difficulty with which an adversary may defeat the security measures. The software code implemented by key generation module 74 may also make it more difficult for an adversary to determine the functions of hardware components of circuit 72.

The configuration of circuit 72 may help improve the security of physics-based key generation by node 12. For example, embedding component 22 into a control loop of circuit 72 may help increase the difficulty with which an adversary may determine the relationship between input data 84 and key 86 generated by circuit 72. As an example, configuring key generation module 74 such that input data 84 is mapped to control data 92 in a non-deterministic fashion may help decrease the possibility that an adversary may determine the relationship between input data 82 and output data 86 by simulating controller 22 and circuit 72 by determining the output 90 of component 22 generated in response to a number of input signals 84 to circuit 72. In some examples, key generation module 74 is configured such that input data 84 is mapped to control data 92 in a non-deterministic fashion by being configured to has or otherwise transform input data 84 to generate control data 82 that DAC 76 converts to analog output signal 94 to drive input conditioning module 78. The transformation of analog output signal 94 by input conditioning module 78 to a output signal 88 for component 22 may also help obfuscate the conversion of input data 84 to physics-based output 90 of component 22.

In some examples, input conditioning module 78 may be configured, e.g., during a manufacturing process, to enable matching of physics-based output 90 of component 22 to a physics-based output of component 42 of node 14 or a component of another node of system 10. In this way, the components 22, 42 may be configured, via respective conditioning circuits, to be a matched pair of components that are configured to generate substantially matching physics-based outputs.

In addition, or instead, output conditioning module 80 may be configured (e.g., tuned) to modify physics-based output 90 of component 22 to a physics-based output of component 42 or another component. The application of output conditioning module 80 and, in some examples, additional processing, to physics-based output 90 of component 22 may help controller 20 generate a substantially similar key as second node 14, even if components 22, 42 are configured to generate different physics-based outputs.

Modifying physics-based output of component 22 with which key generation module 74 generates a key, e.g., by modifying configurations of filter 80, input conditioning module 78, or both, may make it more difficult for an adversary to copy the operation of component 22 in a counterfeit device. For example, including transformative processes upon data within circuit 72 may make it more difficult for an adversary to obtain information about the physical characteristics of component from physics-based output 90 and key 86.

Key generation module 74, component 22, and other elements of circuit 72 may be configured such that an attempt by an adversary to probe circuit 72 may alter (e.g., by physically damaging) one or more of elements of circuit 72. For example, some of the elements of circuit 72 (e.g., output conditioning module 80 or input conditioning module 78) may be located on the same integrated circuit as component 22 or otherwise near component 22, such that it may be more difficult for an adversary to probe component 22 or another element of circuit 72 without altering the performance of one of the components of circuit 12. The physical or electrical alteration to one or more elements of circuit 72 may modify key 86 generated by key generation module 74, e.g., by modifying input 88 to component 22 or output 90 from component 22. As a result of the tampering with circuit 72, key generation module 74 may no longer be configured to generate a key that substantially matches a counterpart circuit of second node 14 or another node with which node 12 may attempt to securely communicate. In this way, tampering with circuit 72 that causes output 86 of circuit 72 to be altered may help restrict the ability of an adversary to obtain useful information from circuit 72.

In other examples, circuit 72 configured to generate a key based on a physics-based output of component 22 may have another configuration. For example, component 22 may be configured to generate a digital output, such that circuit 72 may not include ADC 82 in some examples. As another example, in the example shown in FIG. 4, key generation module 74 is configured to control component 22 via DAC control bus 92. However, other configurations may also be used instead of or in addition to bus 92.

In some examples, key generation module 74 is functionally integrated with controller 20. For example, key generation module 74 and controller 20 may be provided by the same hardware. In other examples, key generation module 74 and controller 20 may be separate modules, e.g., may correspond to individual hardware units, such as ASICs, DSPs, FPGAs, or other hardware units, or one or more common hardware units.

Figure 5:
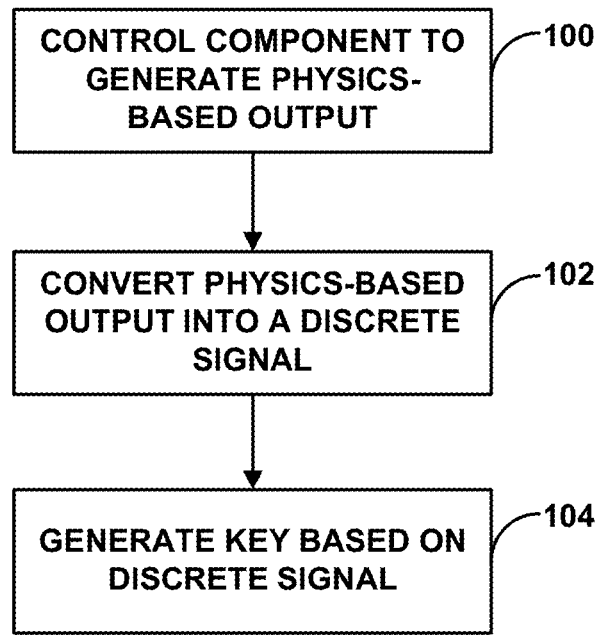
FIG. 5 is a flow diagram of an example technique that may be implemented to generate a key based on a physics-based output of a component that varies over time.

FIG. 5 is a flow diagram of an example technique that a controller may implement in order to generate a key based on a physics-based output of a component. The key may be, for example, any one or more of an authentication key, an encryption key, or a key used for another function. While the technique shown in FIG. 5 is described with respect to first node 12 and circuit 72 (FIG. 4), in other examples, second node 14 or another node of system 10 may implement the technique shown in FIG. 5 to generate a key based on a physics-based output of a component. Second node 14 may, for example, include circuit 72 or a similar circuit configured to generate a key based on a physics-based output of component 42.

In the example technique shown in FIG. 5, controller 20 controls component 22 to generate a physics-based output (100). For example, controller 20 may generate input signal 84 that is received by key generation module 74. In response to receiving the input signal, key generation module 74 may control component 22 to generate physics-based output 90 by, for example, causing an input 88 (e.g., a stimulus or one or more optical signals) to be applied to or otherwise provided to component 22. As discussed above with respect to FIG. 4, in some examples, key generation module 74 may generate a digital output to DAC control bus 92, which converts the output to an analog signal 94 that is received by input conditioning module 78. Input conditioning module 78 may then condition the analog signal 94 and generate signal 88 that is received by component 22 as an input. Signal 88 may be, for example, a stimulus that is applied to component 22 either electrically or mechanically or an optical signal directed at one or more features of component 22 (e.g., a light that is applied to one or more gas filled cells of component 22). In response to receiving signal 88, component 22 may generate physics-based output 90, which is a function of the physical configuration of component 22. Physics-based output 90 may be, for example, a waveform or a particle.

In some examples, such as examples in which physics-based output 90 generated by component 22 is an analog signal, controller 20 may convert physics-based output 90 into a discrete signal (102). For example, with the aid of circuit 72, controller 20 may apply output conditioning module 80 (e.g., a filter) to physics-based output 90 and convert the filtered signal 96 into a digital signal 98 with the aid of ADC 82. Controller 20 may then generate a key (e.g., an authentication key or an encryption/decryption key, or both), based on the discrete signal (104). For example, under the control of controller 20, key generation module 74 may transform input 98 (FIG. 4), which is based on output 90 (FIG. 4) generated by component 22, to generate key 86 (FIG. 4). Key generation module 74 may implement any suitable transformation algorithm (e.g., a transformation function) that results in a unique value.

FIG. 6 is conceptual illustration of an example component 106 that includes a plurality of subcomponents 108A-108N (collectively referred to as "subcomponents 108). Component 106 may include any suitable number of subcomponents 108 (e.g., less than ten, on the order of tens or on the order of hundreds or even thousands). In some examples, one or both nodes 12, 14 may include component 106 and generate a key based on the physics-based output of the respective component 106. Thus, in some examples, component 106 shown in FIG. 6 may be an example of component 22 (FIG. 1) of node 12, an example of component 42 (FIG. 1) of node 14, or both. While component 106 is described with respect to node 12, in other examples, node 14 or another node of system 10 may include component 106.

Subcomponents 108 may each be configured to generate a physics-based output. Subcomponents 108 may have any suitable arrangement relative to each other, and, in some examples, may be arranged in an array. In some examples, controller 20 is configured to generate a key based on the physics-based output generated by a single subcomponent 108. In addition, or instead, in some examples, controller 20 is configured to generate a key based on the outputs generated by a plurality of subcomponents 108 (e.g., a subset of subcomponents 108 or all of subcomponents 108). For example, controller 20 may generate a key based on a combination of the suboutputs from a subset of subcomponents 108 selected by controller 20, where the combination of the suboutputs can be a physics-based output of component 106. In examples in which subcomponent 108 are each configured to generate an electrical signal, the combination can be, for example, an average amplitude, a greatest amplitude, or a smallest amplitude of an electrical signal generated by each subcomponent 108.

As another example of a combination, the suboutput from a particular subcomponent can be used to determine a respective bit of the key (e.g., a 8 bit, 64 bit, 128 bit, or 256 bit key). In this example, number of subcomponents 108 can be selected based on, for example, the number of bits of entropy desired to increase the complexity of cryptographic algorithms implemented by controller 20 to authenticate hardware, encrypt, or decrypt data.

Subcomponents 108 may have any suitable configuration. In some examples, at least one subcomponent 108 includes a light source, a gas cell, and a photodetector. As discussed above, a signal that is generated by the photodetector may indicate the amount of radiation generated by the light source, and transmitted through the gas cell prior to being sensed by the photodetector. The signal that is generated by the photodetector may be an output of the subcomponent 108.

In some examples, due to the physical characteristics or external factors of each subcomponent 108, at least two subcomponents 108 are configured to generate different suboutputs (e.g., a unique analog output) than each other. The suboutput may be unique to the particular subcomponent 108 or to a particular group of subcomponents 108. Thus, a physics-based output of component 106 may be adjusted based on the particular subcomponents 108 that are selected to generate the output. As an example, component 108A may generate a first physics-based output, component 108B may generate a second physics-based output, and a combination of components 108A, 108B may generate a third physics-based output. In some examples, controller 20 may dynamically change the physics-based output with which the key is generated by selecting a subset of subcomponents 108 (e.g., activating a select subset of components 108) and generating the key based on the output from component 106 resulting from the subset of subcomponents 108.

The different combinations of subcomponents 108 that controller 20 may select may help further obfuscate the key generated by controller 20, e.g., by further complicating the path to determining the physics-based output of component 106 used by controller 20 to generate the physics-based key. Controller 20 may, for example, periodically select different combinations of subcomponents 108 to generate the output for generating the key. In examples in which controllers 20, 40 are configured to generate time-matched keys, controller 40 of node 14 may likewise select different combinations of subcomponents of the respective component 42 when controller 20 selects a different combination of subcomponents 108 for generating a key.

In some examples, nodes 12, 14 may each include a respective component 106 (e.g., component 106 may be an example of component 22 and an example of component 42). The components 106 of each of the nodes 12, 14 may be fabricated in a common lot. For example, components 106 or subcomponents 108 may each be a part of a respective integrated circuit that may be formed from a common wafer. Even if components 106 or subcomponents 108 of each of the nodes 12, 14 are fabricated in the same lot, e.g., from the same wafer, during the same manufacturing process, and in the same manufacturing conditions, components 106 may have different physical characteristics. Even relatively minor differences in the physical characteristics of the components 106 may affect the physics-based output generated by the components 106. An authorized manufacturer of component 106 may adjust setup conditions for the manufacturing process to customize a fabricated lot of components 106 and increase the difficulty of creating counterfeit copies of components 106.

As discussed above, system 10 may be configured such that the output of components 106 of each of the nodes 12, 14 substantially match (e.g., at any time or at substantially the same time), such that the respective controllers 20, 40 may authenticate the other node 14, 12, respectively, in response to determining the keys generated by the controllers 20, 40 substantially match. One or more different techniques may be implemented in order to achieve substantially similar physics-based outputs from different components 106. In some examples, controllers 20, 40 may activate different subsets of subcomponents 108 of the respective components 106 to generate substantially similar physics-based outputs. In this way, components 106 including selectable combinations of subcomponents 108 may be useful for substantially matching the output of a particular component 106 to another component 106, e.g., of a different node.

As discussed above with respect to FIG. 4, in some cases, different components 106, even from the same lot, may react differently to different inputs, and, therefore, generate different outputs in response to the same input. Thus, in some examples, controller 20 can modify the output of a particular component 106 (or component 22 or 42) by at least modifying the input (e.g., input 88 shown in FIG. 4) applied to the component 106 to evoke the physics-based output (e.g., output 90 shown in FIG. 4). In the case of a light input, controller 20 can modify the output of a particular component 106 (or component 22 or 42) by at least modifying the behavior of light transmitted through each gas cell of subcomponents 108.

In some examples, the output of a particular component 106 may be modified by at least changing the physical characteristics of the component (e.g., the length of the light path, frequency, refractive index of the light path media, materials of composition, pressure of the gas in gas cells of subcomponents 108, refractive index of materials, and gas absorption coefficients). For example, a coating or another material may be deposited on the component 106 or a subset of the subcomponents 108, where the coating may affect the output generated by the component. In addition to, or instead of the modifications described above, the output of a particular component 106 can be modified by at least modifying an external environmental factor (e.g., temperature, humidity, magnetic field) in which component 106 or particular subcomponents 108 operates.

In some examples in which subcomponents 108 each comprise a light source, at least one gas cell, and a photodetector, the output of a particular component 106 may be modified by changing a property of light transmitted by the light source (e.g., the wavelength of the light) to the respective gas cell, by changing one or more properties that affect how the gas cell modulates light transmitted through the gas cell, by changing the subcomponents 108 that are activated to generate the output of component 106 (e.g., if subcomponents 108 include the same or different gas compositions), by changing one or more external environmental factors, or by changing the timing with which subcomponents 108 or a subset of subcomponents 108 are activated to generate the output of component 106.

Any of the techniques described above for modifying the physics-based output of a particular component 106. e.g., in order to match the output to the output of another component 106, may be used alone or in combination with each other. In addition, or instead, of modifying component 106 until it generates a particular physics-based output, controller 20 (or controller 40) may process the physics-based output generated by component 106, e.g., by application of a filter (e.g., via output conditioning module 80 shown in FIG. 4), in order to generate a key that substantially matches a key generated by another node. In this way, two nodes 12, 14 may generate substantially matching keys based on different physics-based outputs of the respective components. The techniques herein may be used to customize a plurality of circuits 72 (FIG. 4) to generate substantially matching keys.

An understanding of component 106, and, if present, each of the subcomponents 108, may be desirable in order to modify component 106 (e.g., a particular subcomponent 108 or subset of subcomponents 108) to achieve a particular physics-based output that may be matched (e.g., time matched) to a key generated by another node or to a value stored by memory 26 (FIG. 1) of node 12 or another memory. Any suitable algorithm may be implemented in order to gain an understanding of the output of component 106 (or another component) and how it may change based on the input to component 106, the physical configuration of component 106, and the selection of different subsets of subcomponents 108 to generate the output. For example, controller 20 (or another controller, e.g., of a device other than node 12) may control component 106 to generate a particular output, which may be stored in memory 26 as a sample output. The physics-based output of component 106 may then be modified using any one or more of the techniques described above.

Controller 20, alone or with the aid of a user, may then associate a particular modification to the physics-based output resulting from the particular modification in order to generate rules for how the physics-based output of component 106 changes relative to the sample output in response to each of a plurality of modifications. In this way, controller 20 may determine rules for the relationship between the physics-based output of component 106 and a particular modification (e.g., to the input signal, the physical characteristics of component 106, or the specific subcomponents 108 selected to generate the output). This predetermined relationship between the physics-based output and a particular modification may then inform the modifications that are made (e.g., by a user or automatically by controller 20) to the output of component 106 in order to generate a key that substantially time matched to a key generated by another node.

For example, in some examples in which component 106 comprises a plurality of gas cells, controller 20 may determine the physics-based output generated by a particular photodetector response to light having particular parameters (e.g., frequency and wavelength) being transmitted through the respective one or more gas cells. Controller 20 may also determine the physics-based outputs of each of the other photodetectors in response to substantially the same light. In addition, controller 20 may determine the physics-based output of a plurality of subcomponents 108 for a particular set of parameters of light, such that the physical behavior of component 106 may be determined for a plurality of physical configurations.

As another example, in some examples in which component 106 comprises subcomponents 108 each comprising at least one gas cell, controller 20 may determine the physics-based output generated by a particular subcomponent 108A in response to a light having particular characteristics (e.g., a particular wavelength). The output may be, for example, an electrical signal. In this way, component 108 may define a plurality of relationships between light inputs and the outputs generated by subcomponents 108.

Using the rules that establish how the physics-based output of a particular component 106 changes relative to the sample output in response to each of a plurality of modifications, the output of component 106 may be matched to another component, e.g., of the same node or a different node.

Figure 7:
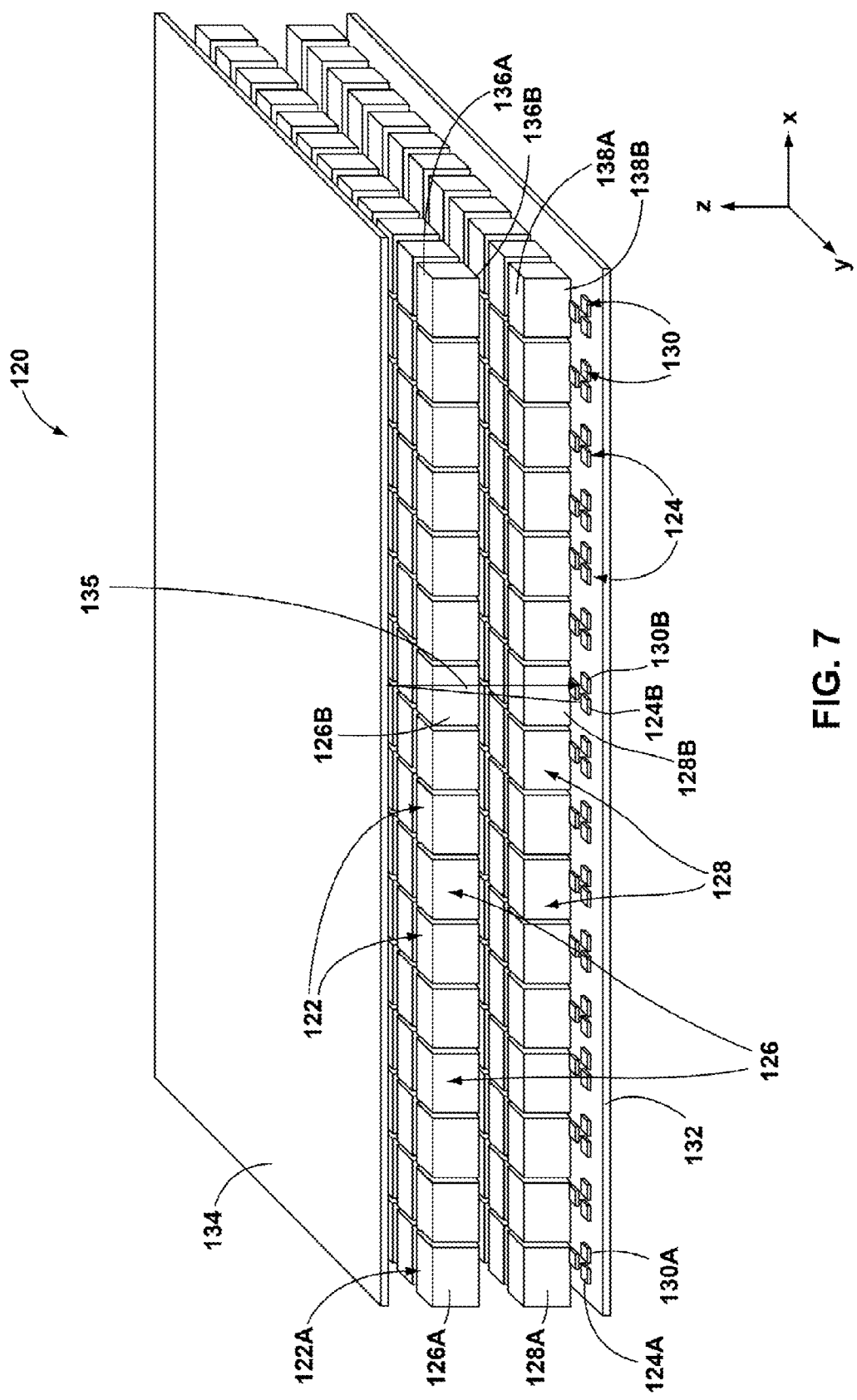
FIG. 7 is a conceptual perspective view of an example component, which includes a plurality of subcomponents that each includes a light source, a first gas cell, a second gas cell, and a photodetector.

FIG. 7 is a conceptual perspective view of an example component 120, which includes a plurality of subcomponents 122. Component 120 is an example of component 106 (FIG. 6). In the example shown in FIG. 7, each subcomponent 122 includes a light source 124, a first gas cell 126 filled with a first gas, a second gas cell 128 filled with a second gas, and a photodetector 130. For example, subcomponent 122A includes light source 124A, first gas cell 126A, second gas cell 128A, and photodetector 130A. Each subcomponent 122 is configured such that a light source 124 and photodetector 130 are aligned with a first gas cell 126 and a second gas cell 128 (e.g., along a straight line or at least the same optical pathway).

In the example shown in FIG. 7, light sources 124 and photodetectors 130 of subcomponents 122 are mechanically coupled to a common substrate 132 (e.g., to a planar surface of the substrate 132). Substrate 132 can be formed from, for example, silicon. In some examples in which substrate 132 is formed from silicon, the silicon may define thermal isolation structures configured to provide thermal stabilization and control of light sources 124 (e.g., vertical cavity surface emitting lasers (VCSELs)) and gas cells 126, 128. For example, the silicon can be micromachined using Deep Reactive Ion Etching (DRIE)) to form the thermal isolation structures.

Component 120 includes reflective surface 134 on an opposite side of cells 126, 128 as substrate 132. At least the side of reflective surface 134 facing cells 126, 128 is configured to reflect light, or at least a particular wavelength of light, emitted by light sources 124. For example, at least the side of reflective surface 134 facing cells 126, 128 can be a mirror.

Light sources 124 can each be any suitable light source configured to generate and emit light. The light can be any suitable radiation that may or may not be visible to a human eye. Light sources 124 can include, for example, a coherent light source, such as, but not limited to, a laser (e.g., a diode laser or a VCSEL), a light emitting diode (LED) or other semiconductor light source, or any combination thereof. Light sources 124 can, but need not be the same as each other.

Photodetectors 130 are each configured to generate a signal (e.g., an electrical signal) that varies as a function of the amount (e.g., intensity) of optical radiation incident on a sensor of the respective photodetector. In this way, each photodetector 130 is configured to sense optical radiation. The amount of optical radiation incident on the sensor may vary as a function of, for example, the amount of light absorbed by gas in cells 126, 128, as discussed in further detail below. The electrical signal generated by each photodetector 130 may be used to determine a property of the light transmitted by a respective light source 124 of the particular subcomponent and transmitted through gas cells 126, 128 of the subcomponent. Photodetectors 130 can each be any suitable type of photodetector, such as, but not limited to, any one or more of complementary metal-oxide-semiconductor (CMOS) sensors, charged coupled devices (CCDs), photoresistors, photodiodes, phototransistors, quantum devices, and the like. Photodetectors 130 can, but need not be the same as each other.

Gas cells 126 and cells 128 each form an enclosure in which a gas is contained. The enclosure can be hermetic in some examples. For example, cells 126, 128 can be vapor cells, such as a miniature vapor cells which have dimensions on a millimeter (mm) or sub-millimeter scale. For example, each cell 126, 128 can be 2 cubic millimeters. Cells 126, 128 are each configured to define an optically conductive pathway from a light source 124 to reflective surface 134, and from reflective surface 134 to a photodetector 130. That is, at least a part of cells 126, 128 positioned in an optical pathway from light sources 124 to reflective surface 134 may be transparent to radiation emitted by a light source 124 at a wavelength at which at least some atoms of the gas in cells 126 undergo an optical transition to an excited state. As a result, in the example shown in FIG. 7, light emitted by a light source 124 of a subcomponent 122 may be transmitted through cells 126, 128 of the subcomponent 122, to reflective surface 134, back through cells 126, 128, and detected by photodetector 130. For example, as shown in FIG. 7, example light 135 emitted by light source 124B propagates through gas cells 126B, 128B, and is reflected by reflective surface 134 back through gas cells 126B, 128B towards photodetector 130B, which senses the resultant light and generates a signal indicative of a property (e.g., intensity) of the light transmitted through gas cells 126B, 128B.

Component 120 can have other configurations in other examples. For example, in other examples of component 120, light sources 124 and photodetectors 130 may be positioned on opposite sides of cells 126, 128 and aligned such that a light emitted by light source 124 propagates only once through a set of gas cells 126, 128 (e.g., one cell 126 and an adjacent cell 128) before being sensed by a photodetector 130. In these examples, component 120 may not include reflective surface 134.

At least some surfaces of one or more cells 126, 128 have a material that is configured to condition the light transmitted through the cell. For example, at least some surfaces of one or more cells 126, 128 may include a coating or be doped with a material that is selected to, for example, change the wavelength of the light emitted by a light source 124 corresponding to the particular set of cells 126, 128. In this example, the coating may be used to adjust a wavelength of light emitted by particular light source 124 to be modulated by the gas the respective gas cells 126, 128. As another example, a layer of material (e.g., a coating, such as a thin dielectric coating) configured to interfere with light constructively or destructively at certain wavelengths can be positioned adjacent (e.g., coated on) at least some surfaces of one or more cells 126, 128. This type of material may act as a filter to condition the light incident on the gas cell. As another example of a layer of material that can be used, a coating that is configured to vary interferometric properties as a function of temperature could be used provide a thermometer to help fine tune the temperature of the respective gas cell. Any of these coatings may be used alone or in combination with each other.

In some examples, first surface 136A, 138A and second surface 136B, 138B of each cell 126, 128, respectively, may be defined by, for example, glass or another optically conductive material, the exact type of which may depend on, for example, the wavelength of light transmitted by light sources 124. For example, at least some or all gas cells 126, 128 can be cells formed using a glass-blowing technique (e.g., from a hollow-core glass fiber). As another example, some or all cells 126, 128 may each be etched into a glass substrate to define first surfaces 136A, 138A and second surfaces 136B, 138B, where the glass is optically conductive. In this example, cells 126, 128 may be formed from the same glass substrate, or may be formed from separate glass substrates. As another example, the surfaces of cells 126, 128 other than first surfaces 136A, 138A and bottom surfaces 136B, 138B may be etched into a substrate that is not conductive to the radiation emitted by light sources 124, 128, and first surfaces 136A, 138A and bottom surfaces 136B, 138B of each cell 126, 128 may be defined by glass or another optically conductive material that is mechanically connected to the opaque or partially-opaque material. For example, at least a portion of cells 126, 128 can be etched into a silicon wafer using a semiconductor fabrication process.

In addition, cells 126, 128 are each configured such that light from the light source 124 of one subcomponent 122 does not incidentally transmit through the gas of another cell 126, 128, respectively. For example, surfaces of cells 126, 128 other than first and second surfaces 136A, 138A, 136B, 138B may be formed from a material that is not transparent to the light emitted by light sources 124, or at least not transparent to a particular wavelength of light selected to excite atoms of the gas in cells 126, 128. The material that is not transparent to the light emitted by light sources 124, or at least not transparent to a particular wavelength of light, may be referred to as an opaque or partially-opaque material. In addition to, or instead of, forming cells 126, 128 from an opaque or partially-opaque material, a separate opaque or partially-opaque layer (e.g., a coating applied to the cell 126, 128 or a separate structure) may be positioned between the cells 126, 128 of adjacent subcomponents 122. An example material for the layer can include, for example, a partially transparent material, such as a thin layer of metal.

In addition to, or instead of, the opaque or partially-opaque material between adjacent cells 126 and between adjacent cells 128, light source 124 and an optical property of reflective surface 132 may be configured to help direct light emitted by a light source 124 of a particular subcomponent 122 to the cells 126, 128 associated with only that subcomponent 122.

The gas in each cell 126 is configured to absorb light at a particular wavelength or band of wavelengths, which may differ between the cells 126 of different subcomponents 122. In particular, the gas includes atoms that have a particular resonant frequency, e.g., the D1 and D2 transitions (referring to transitions to different excitation states) in the case of Rubidium (Rb) and Cesium (Cs). These atoms may be referred to as an atomic gas. For example, the gas composition may be comprised of a mixture of an atomic gas (e.g., Rb, Cs, or iodine) and a buffer gas. Example atomic gases can be those used in atomic clocks, which are highly stable (e.g., less sensitive to external perturbations such as temperature changes compared to less stable gases). While an atomic gas is primarily referred to through the disclosure, in other examples, the atoms that resonate in response to exposure to radiation at a particular wavelength may include another gas. The buffer gas in the cells 126, 128 may help prevent the atomic gas from colliding with the walls of the cells too frequently.

The gas in each cell 126 can also include a molecular gas in some examples, such as iodine.

Light source 124 of each subcomponent 122 is configured to transmit radiation having a wavelength at which the atoms of the atomic gas of the gas in the respective gas cells 126, 128 of the subcomponent 122 are configured to resonate. In particular, the wavelength of the radiation emitted by a light source 124 is selected to be the wavelength at which at least some atoms of the gas in one or more gas cells 126 and at least some of the gas in a respective one or more cells 128 undergo an optical transition to an excited state. For example, in the case of Rb, light sources 124 can be configured to transmit radiation having a wavelength of about 780 nanometers (nm) or about 795 nm or, in the case of Cs, light sources 124 can be configured to transmit radiation having a wavelength of about 852 nm or about 895 nm.

Due to this optical transition to the excited state, the atoms resonate. In this way, at least some atoms of the gas in cells 126, 128 resonate in response to the radiation sourced by light sources 124 at a particular wavelength. The more atoms that resonate in response to the light that is transmitted into cell 126, the less light (e.g., light having a lower intensity) is transmitted through the cell 126 and detected by photodetector 130. Thus, for a particular subcomponent 122, the amount of light sourced by light source 124, transmitted through cell 126, and detected by the photodetector 130 of the respective subcomponent 122 depends on the composition of the gas in the particular cell 126, e.g., may depend on the concentration of atomic gas in the particular cell. In this way, one or more properties of light (e.g., the intensity of light or the intensity of light in a particular frequency band) that is transmitted through the cell may change as a function of the composition of the gas in the respective cell 126.

In some examples, the gas in each first cell 126 is "tuned" to a range of frequencies. That is, the composition of the gas in each first cell 126 can be selected to include atoms that resonate in response to a plurality of frequencies. This may help provide a more robust component 120 that is less sensitive to the relatively small band of light emitted by light sources 124.

In some examples, subcomponent 122 operates in the saturated absorption regime, in which both the light incident on first cell 126 and the light reflecting off of reflective surface 134 participate in the optical transition, which results in a signal (generated by subcomponent 122) that is independent of the thermal motion of the atoms. Thermal motion of the atoms within gas cell 126 may be responsible for "Doppler broadening" of the resonance to a linewidth of about 1 gigahertz (GHz). By operating in the saturated absorption regime, a narrower linewidth (e.g., less than about 10 megahertz (MHz)) may be achieved than can be obtained in a single photon absorption measurement. This may help stabilize the output of subcomponent 122.

In other examples, subcomponent 122 operates in the coherent population transfer (CPT) regime, in which component 22 includes a radio frequency (RF) signal source that is configured to emit a RF signal that modulates light source 124. When the RF modulation frequency is half of the atomic hyperfine splitting frequency (e.g., about 6.8 GHz in the case of Rb atoms) of the atoms in gas cell 126, the result can be a narrow transmission resonance (e.g., about kilohertz (kHz)) superposed on the broad absorption resonance. This may provide the possibility of increased sensitivity of component 22 to external inputs, such as temperature, which may be useful for providing external control of component 22.

In the example shown in FIG. 7, each first gas cell 126 is paired with a respective second gas cell 128, such that there is a one-to-one ratio between first gas cells 126 and second gas cells 128. Other ratios between first gas cells 126 and second gas cells 128 are also contemplated. The gas in each second cell 128 is also configured to absorb light at a particular wavelength band. In some examples, the composition of the gas in each cell 128 of the second gas cells 128 of component 122 is substantially the same (e.g., identical or nearly identical), such that the gas in each cell 128 responds substantially the same (e.g., the same or nearly the same) to substantially the same light. In examples in which at least some of the first gas cells 126 contain a different gas composition than second gas cells 128, the first gas cells 126 and second gas cells 128 having different gas compositions absorb different wavelengths of light. The atomic gas in a second cell 128 can be the same atomic gas in the corresponding first cell 126 in some examples, and can be different in other examples.

The gas in each second cell 128 is selected to be less sensitive to environmental factors than the gas in each first cell 126. For example, second cells 128 can each include a pure atomic gas (with little buffer gas or no buffer gas) that modulate light transmitted through the respective cell 128 in substantially the same way, regardless of the environmental conditions in which component 120 operates. In this way, the gas in each second cell 128 may provide a reference with which the signals generated by photodetectors 130 may be normalized. Second cells 128 may also be referred to as "reference" cells. The normalization may help controller 20 account for drift in the signal generated by photodetector 130 (e.g., due to aging of photodetector 130) as well as account for any influences of the environmental conditions on the response of the gas in first cells 126 to light.

For example, with respect to subcomponent 122A, light source 124A is configured to transmit a light that propagates through cells 126A, 128A, and photodetector 130A is configured to generate an electrical signal indicative of the light transmitted through cells 126A, 128A. In examples in which cells 126A, 128A have different gas compositions, the electrical signal generated by photodetector 130A has two dips: a first dip is indicative of the amount of light absorbed by the gas in first cell 126A and the second dip is indicative of the amount of light absorbed by the gas in second cell 128A. Because the light absorbed by second cell 128A remains substantially the same, regardless of the environmental conditions, the characteristics of the second dip may remain substantially the same regardless of the environmental conditions. In this way, controller 20 can normalize the portion of the electrical signal generated by photodetector 130A and indicative of a property of light (e.g., an amount of absorbed by the gas) transmitted through first cell 126A based on the portion of the electrical signal generated by photodetector 130A and a property of light (e.g., an amount of absorbed by the gas) transmitted through second gas cell 128A. For example, controller 20 may determine that the suboutput generated by subcomponent 122A is the difference between the lowest amplitude (the nadir) of the dip peak and the lowest amplitude (the nadir) of the second dip.

The dimensions of cells 126, 128 may depend on the desired size of component 22. For example, the dimension of each cell can be about 2 cubic millimeters ($m^3$) in some examples.

In some examples of component 120, the first gas cells 126 of at least two subcomponents 122 include different gas compositions. The compositions of gas may differ, for example, based on the type of atomic gas in the gas composition, the concentration of the atomic gas, or both. As a result, the at least two cells 126 are configured to absorb different amounts of light or different frequencies of light. In this way, at least two subcomponents 122 are configured to generate different suboutputs in response to the substantially the same input (e.g., a light having a particular frequency). The gas composition can define a different "state" of the cell. First gas cells 126 of component 120 can include any suitable number of different states, such as two or more. In some examples, each gas cell 126 has a different state. The number of states of gas cells 126 in a particular component 120 can affect the robustness of the key generated by controller 20 by, for example, affecting the complexity of the key generated by controller 20 based on the output of component 120, the number of different possible outputs that can be generated by component 120, or both.

The output generated by component 120 is based on the suboutputs generated by subcomponents 122. For example, controller 20 may add, average, or otherwise combine the suboutputs to determine a key. As another example of how the suboutputs can be combined to determine a key, controller 20 may determine a key based on a plurality of suboutputs from subcomponents 122 by, for example, assigning one or more suboutputs to a respective bit of the key. For example, if the suboutput is an electrical signal, controller 20 can determine a bit of the key based on the electrical signal (e.g., a normalized amplitude of the electrical signal). In this way, controller 20 can translate the suboutputs of a plurality of subcomponents 120 to a multibit code that is used as an authentication key, encryption/decryption key, or both.

In some examples of component 120, cells 126 of subcomponents 122 each have substantially the same gas composition. In this example, the output of component 120 may be based on the suboutputs generated by one or more subcomponents 122. For example, the output of component 120 can be the sum of the suboutputs generated by two or more subcomponents 122. The output of component 120 may be modified by, for example, selecting a different number of subcomponents 122 that are activated to generate the output of component 120.

In some examples in which at least some (or all) of cells 126 have different gas compositions or substantially the same gas composition, controller 20 can dynamically adjust the physics-based output of component 120 with which a key may be generated by selecting a subset (i.e., less than all) of subcomponents 122 to generate the output. Controller 20 can, for example, select a subset of subcomponents 122 by activating a subset of components 122.

A subcomponent 122 can be activated by controller 20 by, for example, controlling the respective light source 124 to generate and transmit a light towards reflective surface 134 along an optically conductive pathway that includes gas cells 126, 128, so as to stimulate the gas in the gas cells. The electrical signal (or other signal) generated by photodetector 130 of the subcomponent 122 and indicative of the intensity of light sensed by photodetector 130 may be the suboutput generated by the respective subcomponent 122. In another example, a subcomponent 122 can be activated by controller 20 by, for example, controlling photodetector 130 of the subcomponent 122 to sense light incident on photodetector 130 and generate a signal indicative of the intensity of the sensed light. In this example, light source 124 may continuously generate and transmit a light towards light reflector 132 along an optically conductive pathway that includes cells 126, 128, or may generate and transmit the light at periodic intervals.

The electrical signal output of each subcomponent 122 can forms a basis of authentication rooted in the physics-based properties of the gas cell 126 that is specific for controlling the properties of light. The physics-based output of component 120 can be modified by modifying one or more physics-based properties of subcomponent 122. The physics-based properties of subcomponent 122 that may control the behavior of light or otherwise affect the output of component 120 can include, for example, materials of composition of any part of subcomponent 122 that is in an optical pathway (also referred to herein as "optical path") of light emitted by light source 124, a pressure of the gas within gas cell 126, a type of gas within gas cell 126, a refractive index of materials of parts of subcomponent 122 that are in the optical pathway of light emitted by light source 124, gas absorption coefficients for gas in cell 126, and the like. The parts of subcomponent 122 that are in the optical pathway of light emitted by light source 124 can include, for example, a structure defining gas cells 126, 128 (e.g., one or more Bragg layers), interface layers between the gas cells 126, 128, between the gas cells 126 and light source 124, between the gas cells 126, 128 and photodetector 126, or between any other elements of subcomponent 122. Other examples of physics-based properties of subcomponent 122 include, for example, a property of light source 124 (e.g., one or more layers of a VCSEL structure, such as a distributed Bragg reflector, which may change the light path in the VCSEL itself can be modified), and the size of gas cells 126 (e.g., changing the size of the gas cell to be thinner in the z-axis direction).

Depending on the number of subcomponents 122 of component 120, controller 20 may select on the order of hundreds or even thousands of different subsets of subcomponents 122 to generate a key. In this way, node 12 including component 120 may be configured to generate a plurality of different physics-based keys with a single component 120. The ability to generate a key based on different combinations of subcomponents 122 may help further obfuscate the key generated by controller 20. For example, controller 20 may periodically change the subset of subcomponents 122 used to generate the output of component 120, e.g., on a predetermined schedule, in response to user input, or at random or pseudo-random times.

The configuration of component 120 shown in FIG. 7 is one example. Component 120 can have other configurations in other examples. For example, although component 120 includes a 16 by 16 array of first gas cells 126 and a 16 by 16 array of second gas cells 128 in the example shown in FIG. 7, in other examples, component 120 can include any suitable number of gas cells 126, 128. For example, component 120 can include a 10 by 10 array of cells. In addition, or instead, each second cell 128 can be used to normalize the output from more than one photodetector. For example, rather than including first gas cells 126 and second gas cells 128 in a one-to-one ratio, component 120 can include a different ratio of cells 126, 128, such as two first gas cells 126 per one reference cell 128, or ten first gas cells 126 per one reference cells 128, and the like. In some examples, component 120 includes a single reference cell 128 that overlaps with each of the first gas cells 126.

In other examples of component 120, each subcomponent 122 can include more than one light source 124, more than one first gas cell 126, more than one second gas cell 128, more than one photodetector 130, or any combination thereof. In addition, in other examples of component 120, one light source 124 may be configured to emit light that transmits through more than one set of gas cells 126, 128. A light source 124 common to a plurality of cells 126, 128 may be an efficient means of transmitting a light through a plurality of gas cells 126, 128 at substantially the same time. In addition, or instead, of a light source 124 being common to more than one set of cells 126, 128, one light photodetector 130 may be configured to generate one or more signals indicative of light that transmitted through more than one set of cells 126, 128. The photodetector may, for example, sense the light that transmitted through a particular set of cells 126, 128 at a first time and then sense the light that transmitted through another set of cells 126, 128 at another time. In this way, the photodetector 130 common to more than one set of cells 126, 128 may be configured to generate a plurality of suboutputs.

Any combination of the different configurations of component 120 may be used together.

Component 120 can include any suitable number of first gas cells 126, such as on the order of tens, hundreds, or even thousands or more in some examples. Thus, component 120 can also include any suitable number of second gas cells 128, which may correspond (e.g., be equal to or otherwise based on) the number of first gas cells 126 of component 120. As discussed above, in some examples, gas cells 126, 128 may each be defined using a semiconductor processing technique; a wafer including a plurality of substantially similar gas cells (e.g., substantially similar sizes and gas compositions) can be diced to form the gas cells. A semiconductor processing technique may be useful for manufacturing relatively small gas cells 126, 128, such as gas cells each having a volume on the order of cubic millimeters. Given the relatively small size of cells 126, 128, the density of subcomponents 122 of component 120, and, therefore, the number of different outputs that may be generated by component 120, can be relatively high for a given size (e.g., footprint) of component 120.

Fabrication of gas cells 126, 128 on a wafer level using semiconductor fabrication techniques may help reduce the size of gas cells 126, 128, as well as help fabricate a plurality of gas cells 126, 128 in batches (e.g., at the same time), which may help reduce the cost of components 120. In addition, when at least some gas cells 126, 128 are formed from a common wafer, and are, therefore, a part of a common batch of cells, the same gas (having the same composition) may be introduced into the gas cells at substantially the same time (e.g., the same time or nearly the same time), such that the gas cells formed from the common wafer have substantially similar (e.g., identical or nearly identical) gas compositions. The gas can include, for example, a vapor of alkali atoms (e.g., Cs or Rb) and, in some examples, a buffer gas.

A gas cell can be formed from a semiconductor wafer using any suitable technique. In one example technique, a plurality of trenches are formed in a substrate defining a wafer (e.g., a bulk silicon or SOI substrate), e.g., using a chemical etching technique, mechanical etching technique (e.g., milling), or a micro-machining technique. A first glass layer, e.g., a borosilicate glass wafer, such as a Pyrex glass wafer available from Corning Incorporated of Corning, N.Y., can then be bonded to one side of the substrate. The glass layer can be, for example, bonded to the substrate using an anodic bonding technique or another suitable wafer bonding technique. Inside a vacuum environment, a first gas can be inserted into each trench defined by the substrate, and a second glass layer can then be bonded to the other side of the substrate from the first glass layer. The first and second glass layers are formed from a material that is transparent to the wavelength of radiation at which the atomic gas of the gas deposited in the trenches transitions to an excited state.

The gas can be inserted into each cell 126, 128 being formed using any suitable technique. In some examples, molten liquid Rb is inserted directly into each cell using a heated micro-syringe. The liquid cools and "freezes" at about 40° C. At room temperature, the Rb is a solid, but it still has a nonzero vapor pressure, so at room temperature, a sealed gas cell with a relatively small chunk of Rb in it may have a partial pressure of somewhere around $10^{-7}$ Torr of Rb.

In some examples, the first gas that is inserted into each trench undergoes a reaction (e.g., by heating the substrate, gas layers, and first gas) to convert the first gas into the gas having the desirable composition for the gas cells 126, 128 being formed. For example, the first gas can be a mixture of barium azide ($BaN_6$) and cesium chloride (CsCl), which, when heated to 120° C., undergoes a reaction and produces cesium metal. In addition, in some examples, the substrate, the glass layers, and the first gas (or second gas) are further treated (e.g., heat treated) to form a hermetic seal between the glass layers and the substrate, thereby sealing the gas in the cells defined by the substrate and glass layers.

After the glass layers are bonded to the substrate, the substrate and glass layers can be diced using a semiconductor fabrication technique or any other suitable technique to define a plurality of cells (e.g., which can each be used as one type of cell 126 or 128). The substrate and glass layers can be diced between holes (defined in the substrate).

In other examples, cells 126, 128 can be formed using any other suitable technique.

The environmental temperature in which component 120 operates may affect the resonant frequencies of the atomic gas atoms in cells 126, 128. Thus, the environmental temperature may affect the amount of light absorbed by the gas in a particular cell, and, therefore, the output generated by component 22. In order to help minimize the effects of the environmental temperature, component 120 may be disposed in a package (e.g., an outer housing).

Figure 8:
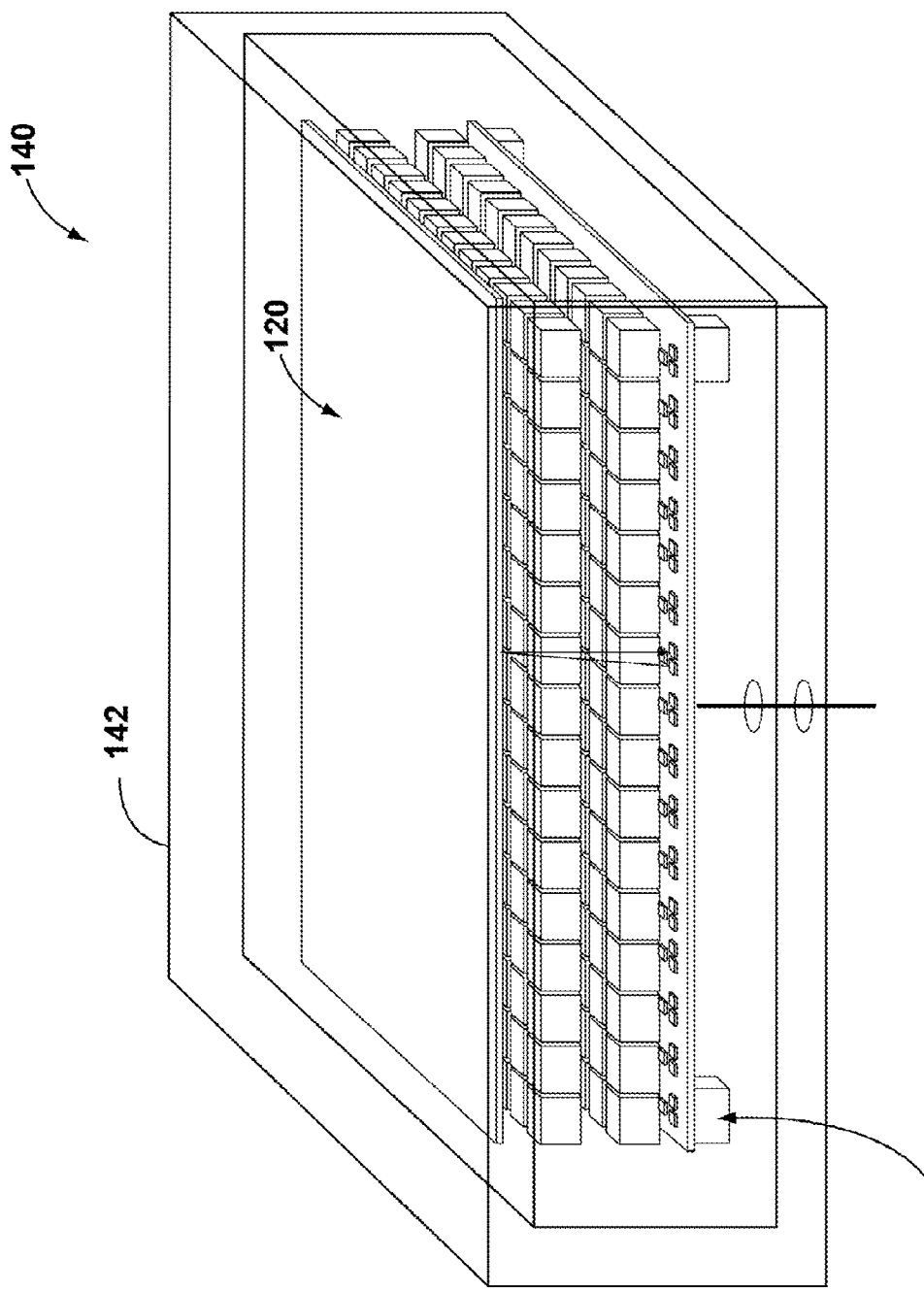
FIG. 8 is a conceptual perspective view of the component of FIG. 7 enclosed within a package.

FIG. 8 is a conceptual perspective view of an example assembly 140 that includes component 120 enclosed within package 142. In the example shown in FIG. 8, component 120 is substantially fully enclosed within package 142 (e.g., fully enclosed but for openings for electrical connections to component 120. In some examples, package 140 is hermetically sealed. Package 142 may be defined from any suitable material, such as a ceramic.

Package 142 can include, for example, a base that defines an interior cavity in which component 120 is positioned and a lid that mechanically connects to the base to substantially fully enclose component 120. In the example shown in FIG. 8, component 120 is positioned on a bottom surface of an interior cavity defined by package 142. Any suitable technique can be used to secure component 120 to package 142. For example, in the example shown in FIG. 8, component 120 is mechanically connected to package 142 via a plurality of solder balls 144.

Package 142 is configured to help regulate the operating environment for component 120. For example, package 142 may define a vacuum or a partial vacuum, or a buffer gas or another gas can surround component 120 within package 142. The vacuum or buffer gas may help stabilize the gas in gas cells 126, gas cells 128, or both types of gas cells 126, 128. For example, some atomic gas particles, such as Rb atoms, have no sensitivity to outside temperature in a perfect vacuum. Thus, the vacuum or partial vacuum defined by package 142 may help prevent any shifts in the response of the gas in first cells 126 to environmental temperatures.

Package 142 may define one or more electrically conductive traces or vias that are configured to electrically connect to component 120, e.g., via one or more wires or electrical contacts. As a result, when component 120 is enclosed in package 142, component 120 is electrically connected to the one or more electrically conductive traces or vias of package 142. Package 142 is configured to electrically connect component 120 to controller 20, either directly or indirectly. For example, package 142 can be similar to an integrated circuit package and can include conductive pins or other electrically conductive features that electrically connect the one or more traces or vias of package 142 to traces of a printed board when package 142 is mounted to the printed board. The printed board can be a printed board of node 14 on which controller 20 is also mounted.

Figure 9:
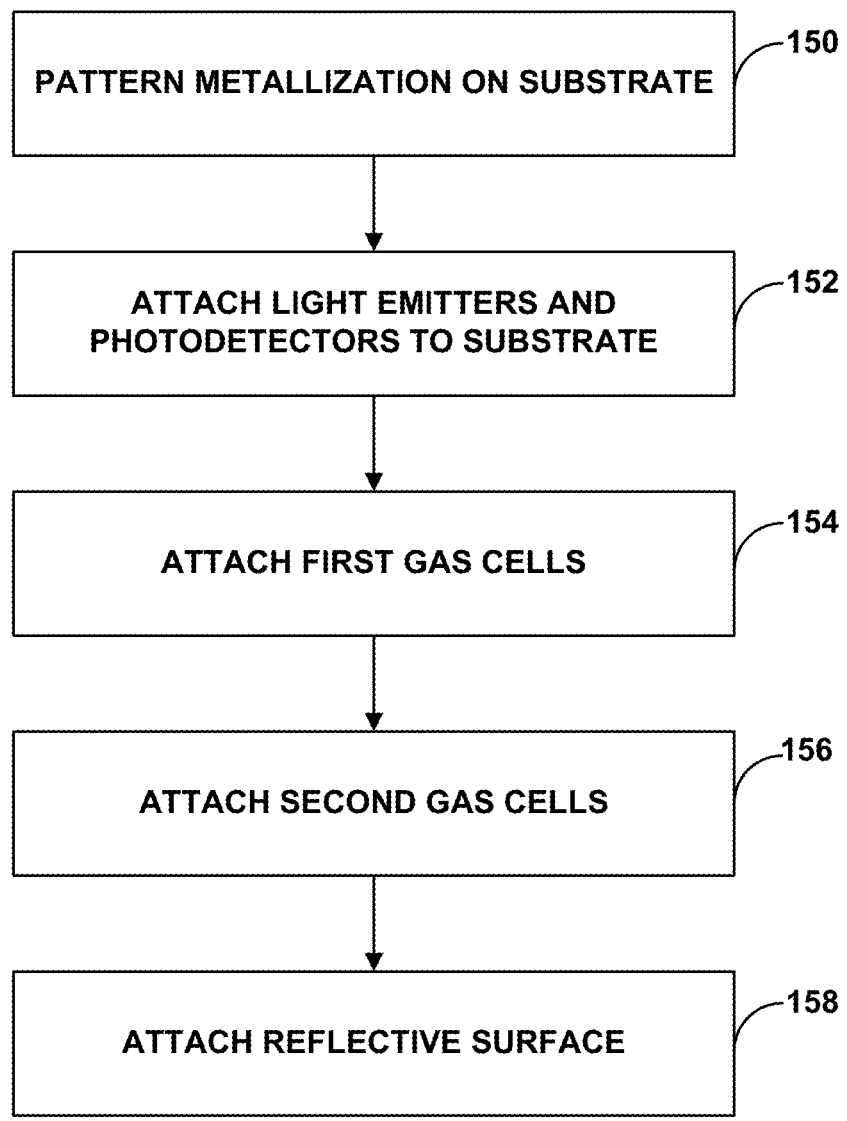
FIG. 9 is a flow diagram illustrating an example of a technique for forming a component including a plurality of subcomponents each comprising a light source, a gas cell, and a photodetector.

FIG. 9 is a flow diagram of an example technique for forming component 120 that includes a plurality of subcomponents 122, each subcomponent 122 comprising a light source 124, a first gas cell 126, a second gas cell 128, and a photodetector 130. For purposes of illustration only, the technique of FIG. 9 will be described with concurrent reference to the conceptual and schematic block diagrams shown in FIGS. 10A-10F. In particular, FIGS. 10A-10F illustrate conceptual side views of various stages of the component 120 fabrication process. For ease of description, FIGS. 10A-10F illustrate three light sources 124A-124C, which are a subset of light sources 124 shown in FIG. 7, and three photodetectors 130A-130C, which are a subset of photodetectors 130 shown in FIG. 7. In other examples, the technique shown in FIG. 9 and described with respect to FIGS. 10A-10F can be used to form a component 120 having any suitable number of light sources 124 and photodetectors 130.

The technique of FIG. 9 includes patterning metallization on substrate 132 for electrical connections to component 120 (150), attaching light sources 124 and photodetectors 130 to substrate 132 (152), attaching a plurality of second gas cells 128 to substrate 132 (154), attaching a plurality of first gas cells 126 to second gas cells 128 (156), and attaching reflective surface 134 to the assembly (158).

Figure 10A:
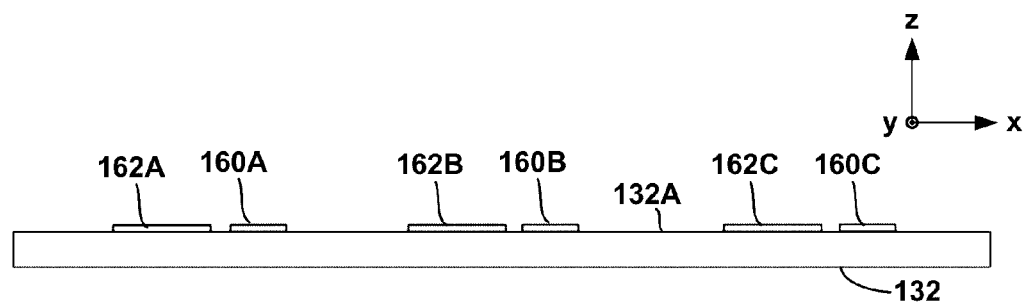
FIGS. 10A-10F are conceptual block diagrams illustrating various steps of the example technique of FIG. 9.

As shown in FIG. 10A, patterning metallization on substrate 132 for electrical connections to component 120 (150) can include forming electrical contacts 160A, 160B, 160C, 162A, 162B, and 162C on top surface 132A of substrate 132. Top surface 132A can be substantially planar (e.g., planar or nearly planar). Electrical contacts 160A-160C, 162A-162C are positioned such that they are aligned with and electrically connect to electrically conductive vias or traces in substrate 132. Substrate 132 can be, for example, formed from an electrically nonconductive material that defines a plurality of pathways in which an electrically conductive material is positioned to define the vias and traces. Electrical contacts 160A-160C, 162A-162C can be patterned on top surface 132A of substrate 132 using any suitable technique, such as via an electroplating technique, an electroless plating technique, or an electrochemical deposition technique. The technique can be, but need not be, a thin film metallization technique. For example, a metal can be deposited using a deposition technique such as sputtering or evaporation. In some cases, the deposited metal may be lithographically patterned to define electrical contacts.

Electrical contacts 160A-160C define an electrically conductive pathway for providing electrical signals to light sources 124A-124C (FIG. 10C), respectively. In addition, electrical contacts 162A-162C define an electrically conductive pathway for receiving electrical signals from photodetectors 130A-130C (FIG. 10C). In this way, electrical contacts 160A, 162A may define a set of electrical contacts corresponding to a particular subcomponent 122A, electrical contacts 160B, 162B may define a set of electrical contacts corresponding to a particular subcomponent 122B, and electrical contacts 160C, 162C may define a set of electrical contacts corresponding to a particular subcomponent 122C.

Figure 10B:
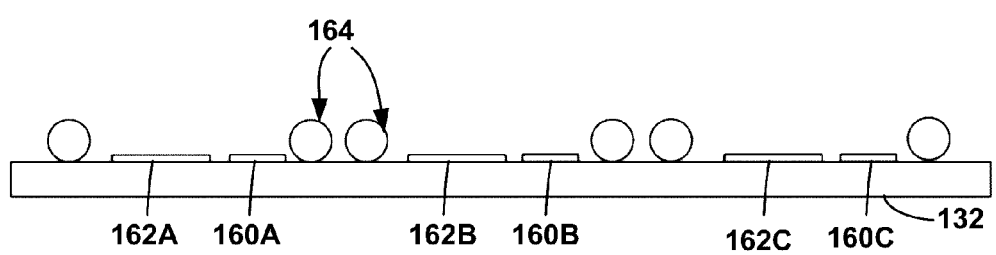
Figure 10C:
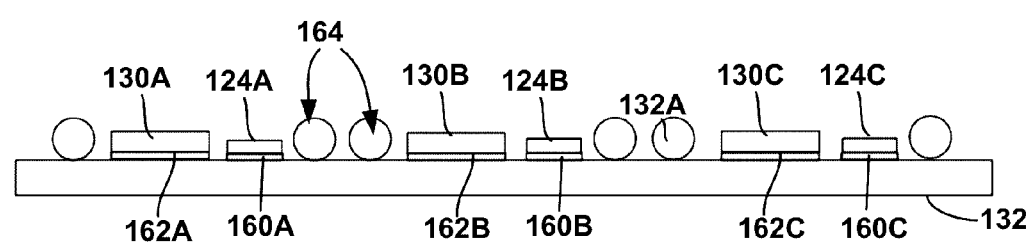

As shown in FIG. 10B, in some examples, solder balls 164 are deposited on substrate 132, between sets of electrical contacts 160A-160C, 162A-162C. As discussed below with respect to FIG. 10D, solder balls 164 may be used to mechanically connect second gas cells 128A-128C to substrate 132. Solder balls 164 can be deposited on substrate 132 at any suitable time prior to attaching gas cells 128A-128C to substrate 132, e.g., prior to attaching light sources 124A-124C and photodetectors 130A-130C, as shown in FIG. 10B, or after attaching light sources 124A-124C and photodetectors 130A-130C.

After patterning the metallization on substrate 132, light sources 124A-124C and photodetectors 130A-130C are attached to substrate (152). As shown in FIG. 10C, light sources 124A-124C are aligned with and mechanically and electrically connected to electrical contacts 160A-160C, respectively, and photodetectors 130A-130C are aligned with and mechanically and electrically connected to electrical contacts 162A-162C, respectively. For example, light sources 124A-124C can be attached to the respective electrical contact 160A-160C and photodetectors 130A-130C can be attached to the respective electrical contacts 162A-162C via one or more of an electrically conductive adhesive, a solder connection, thermocompression, or thermosonic bonding.

Electrical contacts 160A-160C may be used to deliver power (e.g., current) with which light sources 124A-124C, respectively, may generate and emit light. In addition, electrical contacts 162A-162C may be used to transmit electrical signals generated by photodetectors 130A-130C and indicative of a property (e.g., intensity) of light sensed by the respective photodetector to controller 20 (or another controller). Electrical contacts 160A-160C, 162A-162C may also be used to deliver control signals to light sources 124A-124C and photodetectors 130A-130C, respectively.

Although not shown in FIGS. 10A-10F, in some examples, each component 122A-122C includes a respective controller that controls the respective light source 124 or photodetector 130. e.g., based on master control signals from controller 20. In these examples, the controller of each subcomponent 122A-122C can be positioned on substrate 132, e.g., in a manner similar to light sources 124 and photodetectors 130 described above.

Figure 10D:
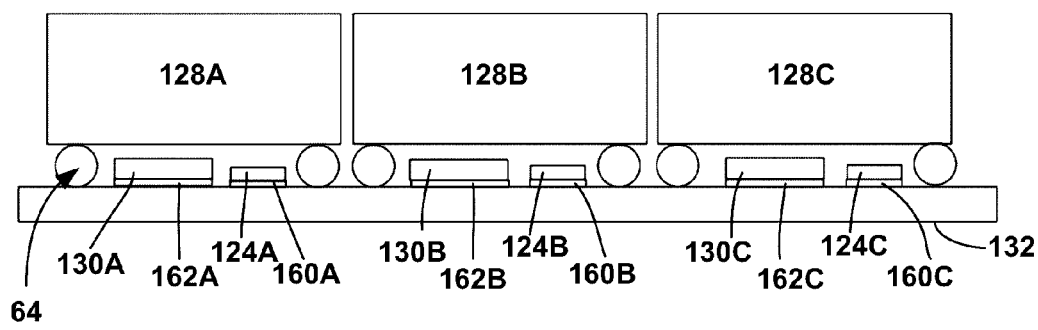

As shown in FIG. 10D, after attaching light sources 124A-124C and photodetectors 130A-130C to substrate 132, via the respective electrical contacts 160A-160C, 162A-162C, second gas cells 128A-128C are attached to substrate 132 via solder balls 164 (156). Second gas cell 128A is aligned with light source 124A and photodetector 130A and attached to substrate 132 via solder balls adjacent light source 124A and photodetector 130A. Similarly, second gas cells 128B, 128C are aligned with respective light sources 124B, 124C and respective photodetectors 130B, 130C, and attached to substrate 132 via solder balls adjacent the respective light sources 124B, 124C and the respective photodetectors 130B, 130C. Aligning second gas cells 128A-128C with the respective light sources 124A-124C and photodetectors 130A-130C permits the light emitted by the light sources 124A-124C to transmit through the respective second gas cells 128A-128C and for the light transmitted through second gas cells 128A-128C to be sensed by the respective photodetectors 130A-130C.

In some examples, second gas cells 128A-128C are attached to substrate 132 substantially simultaneously, e.g., because second gas cells 128A-128C are positioned on common substrate. In other examples, second gas cells 128A-128C are individual elements and are individually positioned relative to substrate and attached to substrate 132.

Figure 10E:
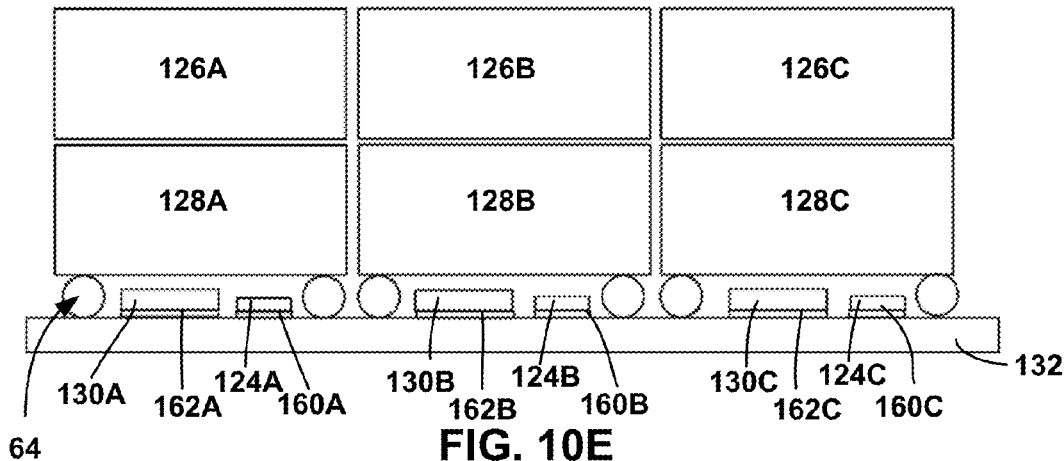

Second gas cells 128A-128C can be attached to substrate 132 using any suitable technique. In some examples, a machine (e.g., a robotic arm), under the control of a machine controller, holds second gas cells 128A-128C, aligns second gas cells 128A-128C with the respective light sources 124A-128C and photodetectors 130A-130C on substrate 132, and bonds second gas cells 128A-128C to solder balls 164 on substrate 132 via, e.g., a lower melting temperature solder or an adhesive, such as epoxy. Other techniques for attaching second cells 128A-128C to substrate 132 can be used. For example, in some examples, second cells 128A-128C can be attached to substrate 132 via one or more of an adhesive, a solder connection, thermocompression, or thermosonic bonding After attaching second gas cells 128A-128C to substrate 132, first gas cells 126A-126C are each attached to a respective one of second gas cells 128A-128C (156). As shown in FIG. 10E, first gas cell 126A is attached to second gas cell 128A, first gas cell 126B is attached to second gas cell 128B, and first gas cell 126C is attached to second gas cell 128B. First gas cells 126A-126C are each attached (e.g., secured) to a respective one of second gas cells 128A-128C using any suitable technique, such as an adhesive. The mechanical connection between first gas cells 126A-126C and the respective second gas cell 128A-128C maintains an optically conductive pathway between the respective set of first and second gas cells so that when a light source 124A-124C emits a light towards the respective second gas cell 128A-128C, the light transmits through the second gas cell and to the respective first gas cell. 126A-126C. Likewise, the optically conducive pathway between the respective set of first and second gas cells permits each photodetector 130A-130C to sense light emitted by a respective light source 124A-124C and transmitted through both the respective first and second gas cells.

In some examples, first gas cells 126A-126C are attached to second cells 128A-128C substantially simultaneously, e.g., because first gas cells 126A-126C are positioned on common substrate. In other examples, first gas cells 126A-126C are individual elements and are individually positioned relative to substrate and attached to the respective second cell 128A-128C.

In addition, although FIG. 9 and FIGS. 10D and 10E illustrate first gas cells 126A-126C and second gas cells 128A-128C being attached at different times, in some examples, first gas cells 126A-126C are preattached to a respective second gas cell 128A-128C (prior to attaching second gas cells 128A-128C to substrate 132), and the first gas cells 126A-126C and second gas cells 128A-128C are attached to substrate 132 at substantially the same time. In addition, although FIG. 9 and FIGS. 10D and 10E illustrate second gas cells 128A-128C being positioned between first gas cells 126A-126C and light sources 124A-124C, in some examples, first gas cells 126A-126C can be positioned between second gas cells 128A-128C and light sources 124A-124C.

Figure 10F:
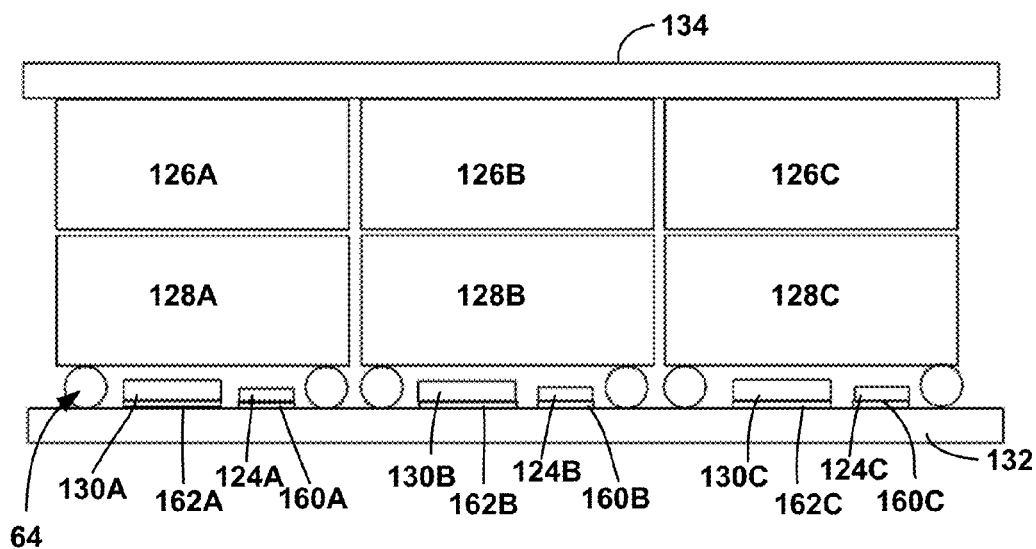

In the example shown in FIGS. 10A-10F, component 120 being fabricated includes reflective surface 134, which, as shown in FIG. 10F, can be attached to first gas cells 126A-126C (158). Reflective surface 134 can be attached to gas cells 126A-126C using any suitable technique, such as via an adhesive. At least the surface of reflective surface 134 facing first gas cells 126A-126C is configured to reflect radiation emitted by light sources 124A-124C and transmitted through first and second gas cells 126A-126C, 128A-128C back towards the respective photodetector. Thus, if the adhesive or other mechanism used to connect reflective surface 134 to first gas cells 126A-126C is positioned between reflective surface 134 and first gas cells 126A-126C, the adhesive or other mechanism is optically transparent to the at least the wavelength of light emitted by light sources 124A-124C or positioned outside of the optical path.

Reflective surface 134 can be, for example, a mirror. As shown in FIG. 10F, in some examples, reflective surface 134 is a unitary layer that is substantially continuous across all of the first gas cells 126A-126C. In other examples, a separate reflective surface 134 can be attached to each first gas cell 126A-126C.

Although not shown in the figures, in some examples, after being fabricated, component 120 can be enclosed within package 140.

The technique of FIG. 9 can be performed automatically in some examples, e.g., under the control of a controller. In other examples, the technique of FIG. 9 can be performed under user control. Any suitable technique can be used to position and attach each element (e.g., light sources 124A-124C, photodetectors 130A-130C, first gas cells 126A-126C, or second gas cells 128A-128C are positioned and attached to another element or to substrate 132. In some examples, a machine (e.g., a robotic arm), under the control of a machine controller, handles (e.g., grasps) the element and positions and attaches the element to another element or substrate 132 to fabricate component 120.

In examples in which component 120 does not include reflective surface 134, the technique shown in FIG. 9 may not include attaching reflective surface 134 to first gas cells 126A-126C (158). Instead, the technique may include attaching light sources 124 and photodetectors 130 to opposite sides of a set of first and second gas cells 126, 128.

As discussed above, component 120, as well as other components configured to generate a physics-based output, can be used to secure communication between two nodes.

Figure 11:
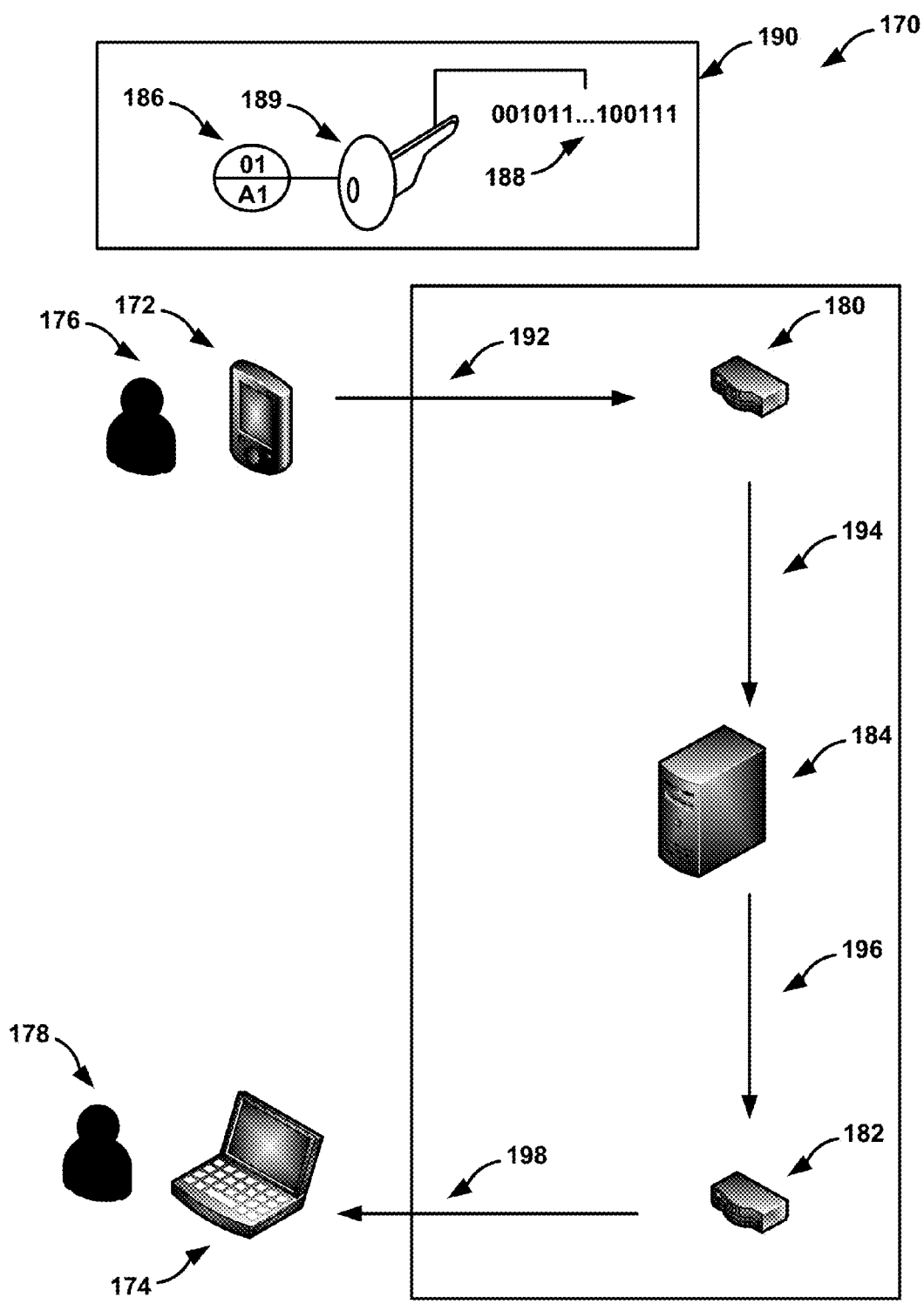
FIG. 11 is a conceptual diagram of a system that includes a handheld device configured to securely communicate with a remote computer using physics-based keys.

FIG. 11 is a conceptual diagram of another example system 170 that includes handheld device 172 configured to securely communicate with remote computer 174 using physics-based keys described herein. In the example shown in FIG. 11, user 176 is configured to interact with handheld device 172 and user 178 is configured to interact with remote computer 174. Handheld device 172 is configured to communicate with remote computer 174 with the aid of routers 180, 182 and server 184. Handheld device 172 and remote computer 174 may each be an example of a node 12 or 14 described with respect to FIG. 1. In some examples, at least one of router 180, router 182, or server 184 may also be an example of a node 12 or 14.

As shown in FIG. 11, a controller of handheld device 172 is configured to generate a first physics-based key 186 based an output generated by a component of handheld device 172 during a time period P1. The controller may, with the aid of a communications module of device 172, transmit first physics-based key 186 along with other data 188 to be communicated to remote computer 174. First physics-based key 186 may be part of information stream 190, which, in the example shown in FIG. 11, also includes data 188, which as been encrypted using any suitable technique, such as an AES algorithm 189 or using key 186. A controller of handheld device 172 may transmit information stream 190 to router 180 via local network 192.

In the example shown in FIG. 11, router 180 includes a component that is configured to generate an output (referred to as a "second output" for ease of description) that is substantially similar to the output generated by the first component of handheld device 172. A controller of router 180 may generate a key (referred to as "second key" for ease of description) based on the second output of the component of router 180. The output generated by the component of router 180 can be generated during time period P1 that is substantially similar to the output generated by the first component of handheld device 172 during time period P1. In this way, handheld device 172 and router 180 may be configured to generate time-matched keys. In other examples, the keys generated by handheld device 172 and router 180 may not be time matched in order to match each other.

A controller of router 180 may receive the information stream 190 from handheld device 172, e.g., via a communications module of router 180, and the controller of router 180 may authenticate the stream 190 by at least confirming that the first and second keys substantially match. In response to determining the first and second keys do not substantially match, the controller of router 180 may take a responsive action, such as discarding information stream 190, generating a notification that is transmitted to remote computer 174 to indicate a potential security compromise, or any other suitable action.

In response to determining the first and second keys substantially match, the controller of router 180 may forward information stream 190 onto server 184 via link 194. If a controller of server 184 is configured to generate a key based on the output of a component of server 184, then server 184 may authenticate stream 190 by at least confirming that the key generated by server 184 substantially matches the second key. In response to determining the key generated by server 184 does not substantially match the first key 186 of stream 190, the controller of server 184 may take a responsive action, such as discarding information stream 190, generating a notification that is transmitted to remote computer 174 to indicate a potential security compromise, or any other suitable action.

In response to determining the key generated by server 184 substantially matches the first key of stream 190, the controller of server 184 may forward information stream 190 onto router 182 via link 196. In other examples, server 184 may be configured to pass information stream 190 onto router 182 without authenticating router 180. As part of local network 198, router 182 may include a controller and a third component, where the controller may be configured to generate a third key based on an physics-based output (referred to herein as a "third output" for ease of description) of the third component. In this way, the controller of router 182 is configured to generate a key (referred to herein as a "third key" for ease of description) based on the physics-based output of the third component. The third component may be configured to generate the third output during the time period T1, where the third output that substantially matches the first output of the first component generated during time period T1 in examples in which the third is time matched to the first key.

Router 182 may receive the information stream 190 from server 184 and authenticate the stream by at least comparing the first key of stream 190 and the third key. In response to determining the first and third keys do not substantially match, the controller of router 182 may take a responsive action, such as discarding information stream 190, generating a notification that is transmitted to remote computer 174 to indicate a potential security compromise, or any other suitable action.

In response to determining the first and third keys substantially match, router 182 may forward information stream 190 to remote computer 174 via local area network 198. In the example shown in FIG. 11, remote computer 174 includes a component that is configured to generate an output (referred as a "fourth output" for ease of description) that is substantially similar to the output generated by the first component of handheld device 172. The fourth output can be generated during time period P1 in examples in which handheld device 172 and remote computer 174 generate time-matched keys. A controller of remote computer 174 may be configured to generate a key (referred to as "fourth key" for ease of description) based on the fourth output of the component of remote computer 174. A controller of remote computer 174 may receive the information stream 190 from router 182, and the controller of remote computer 174 may authenticate the stream 190 by at least confirming that the first and fourth keys substantially match.

In another example of system 170, the controller of handheld device 172 may include more than one physics-based key generated by respective components of handheld device 172 in information stream 190. For example, two or more of router 180, server 184, router 182, or remote computer 174 may be configured to authenticate information stream 180 based on different physics-based keys.

In examples in which the component used to generate a physics-based output based on which a key is generated includes component 120 or another component including an array of gas cells, light sources, and photodetectors, each of the elements (e.g., handheld device 172, routers 180, 182, server 184, and remote computer 174) of system 170 that are configured to generate substantially matching keys can include components 120 that have been formed from gas cells of the same batch (or multiple batches in the case of an array of gas cells having different gas compositions), such that the components can generate outputs that substantially match.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise RAM, such as synchronous dynamic random access memory (SDRAM), ROM, NVRAM, EEPROM, FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described encryption, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A system comprising:
    a component configured to generate an output, wherein the component comprises:
        a first plurality of gas cells each filled with a gas;
        a second plurality of gas cells;
        at least one light source configured to emit a light that transmits through at least one gas cell of the first plurality of gas cells and at least one gas cell of the second plurality of gas cells; and
        at least one photodetector configured to generate a signal indicative of a property of the light transmitted through the at least one gas cell of the first plurality of gas cells and the at least one gas cell of the second plurality of gas cells, the signal comprising a first portion indicative of a property of the light transmitted through the at least one gas cell of the first plurality of gas cells and a second portion indicative of a property of the light transmitted through the at least one gas cell of the second plurality of gas cells, wherein the output generated by the component is based on the signal generated by the at least one photodetector; and a controller configured to:
- select a subset of gas cells from the first plurality of gas cells, wherein the signal generated by the at least one photodetector is indicative of the property of the light transmitted through the selected subset of gas cells,
- receive the output generated by the component based on the signal generated by the at least one photodetector indicative of the property of the light transmitted through the selected subset of gas cells,
- normalize the first portion of the signal generated by the photodetector based on the second portion of the signal, and
- generate a key based on the output.

2. A system comprising:

a component configured to generate an output, wherein the component comprises:
- a plurality of gas cells each filled with a gas;
- at least one light source configured to emit a light that transmits through at least one gas cell of the plurality of gas cells; and
- at least one photodetector configured to generate a signal indicative of a property of the light transmitted through the at least one gas cell of the plurality of gas cells, wherein the output generated by the component is based on the signal generated by the at least one photodetector; and a controller configured to:
- select a subset of gas cells from the plurality of gas cells, wherein the signal generated by the at least one photodetector is indicative of the property of the light transmitted through the selected subset of gas cells,
- receive the output generated by the component based on the signal generated by the at least one photodetector indicative of the property of the light transmitted through the selected subset of gas cells, and
- generate a key based on the output, wherein the at least one light source comprises a plurality of light sources and the at least one photodetector comprises a plurality of photodetectors, wherein the component comprises a plurality of subcomponents, each subcomponent comprising a gas cell of the plurality of cells, a light source of the plurality of light sources, and a photodetector of the plurality of photodetectors, wherein each subcomponent is configured to generate a suboutput based on the signal generated by the respective photodetector and indicative of a property of the light transmitted through the gas cell of the subcomponent, at least two subcomponents being configured to generate different suboutputs, and wherein the controller is configured to select the subset of gas cells by at least selecting at least two subcomponents of the plurality of subcomponents, the output generated by the component being based on the suboutputs of the at least two subcomponents.

3. The system of claim 1, wherein at least two gas cells of the first plurality of gas cells are filled with different compositions of gas.

4. The system of claim 1, wherein the controller is configured to at least one of encrypt or decrypt data with the key.

5. The system of claim 1, wherein the key comprises a first authentication key, the system further comprising a memory that stores a second authentication key, wherein the controller is configured to determine whether the first and second authentication keys match, and authenticate hardware of the system in response to determining the first and second authentication keys match.

6. The system of claim 1, further comprising a reflective surface positioned on an opposite side of the first plurality of cells from the at least one light source and the at least one photodetector, where the reflective surface is configured to reflect the light generated by the at least one light source.

7. The system of claim 1, wherein each gas cell of the second plurality of gas cells corresponds to a respective gas cell of the first plurality of gas cells.

8. The system of claim 1, wherein the gas comprises an alkali metal and a buffer gas.

9. The system of claim 1, wherein the component comprises a first component comprising at least one first light source, and at least one first photodetector configured to generate a first signal, wherein the key comprises a first key, wherein the output comprises a first output, and wherein the controller comprises a first controller, the system comprising a first node comprising the first component and the first controller, the system further comprising:

- a second node comprising a second component configured to generate a second output, the second component comprising:
  - a third plurality of gas cells each filled with a gas, wherein at least two cells of the third plurality of gas cells are filled with different compositions of gas;
  - at least one second light source configured to emit a light that transmits through at least one gas cell of the third plurality of gas cells; and
  - at least one second photodetector configured to generate a second signal indicative of a property of the light emitted by the at least one second light source and transmitted through the at least one gas cell of the third plurality of gas cells, wherein the second output generated by the second component is based on the second signal generated by the at least one second photodetector; and
- a controller configured to generate a second key based on the second output, wherein the first controller is configured to receive the second key, compare the first and second keys, and authenticate the second node in response to determining the first and second keys match.

10. A method comprising:

selecting, by a controller, a subset of gas cells from a first plurality of gas cells of a component, wherein the component comprises:
- the first plurality of gas cells each filled with a gas, wherein at least two gas cells are filled with different compositions of gas;
- a second plurality of gas cells;
- at least one light source configured to emit a light that transmits through at least one gas cell of the first plurality of gas cells and at least one gas cell of the second plurality of gas cells; and
- at least one photodetector configured to generate a signal indicative of a property of the light transmitted through the at least one gas cell of the first plurality of gas cells and the at least one gas cell of the second plurality of gas cells, the signal comprising a first portion indicative of a property of the light transmitted through the at least one gas cell of the first plurality of gas cells and a second portion indicative of a property of the light transmitted through the at least one gas cell of the second plurality of gas cells, wherein the output generated by the component is based on the signal generated by the at least one photodetector;

receiving, by the controller, the output generated by component;

normalizing the first portion of the signal generated by the photodetector based on the second portion of the signal; and generating, by the controller, a key based on the output.

11. The method of claim 10, wherein the at least one light source comprises a plurality of light sources and the at least one photodetector comprises a plurality of photodetectors, wherein the component comprises a plurality of subcomponents, each subcomponent comprising a gas cell of the first plurality of gas cells, a light source of the plurality of light sources, and a photodetector of the plurality of photodetectors, wherein each subcomponent is configured to generate a suboutput based on the signal generated by the respective photodetector and indicative of a property of the light transmitted through the gas cell of the subcomponent, at least two subcomponents being configured to generate different suboutputs, and wherein selecting the subset of gas cells comprises selecting at least two subcomponents of the plurality of subcomponents, the output generated by the component being based on the suboutputs of the at least two subcomponents.

12. The method of claim 10, wherein the key comprises a first key, the method further comprising:

determining, with the controller, whether the first key matches a second key; and authenticating hardware of a system comprising the component in response to determining the first and second authentication keys match.

13. The method of claim 10, further comprising, with the controller, at least one of encrypting or decrypting data with the key.

14. The method of claim 10, wherein a first node comprises the component and the controller, the method further comprising:

receiving a second key from a second node;

determining, with the controller, whether the first and second keys match; and authenticating the second node in response to determining the first and third keys match.

15. The system of claim 1, wherein the output generated by the component is modified by at least one of a temperature of the environment in which the component operates, a humidity level of the environment in which the component operates, a magnetic field in which the component is positioned, a power of the at least one light source, or a wavelength of the at least one light source.

16. The method of claim 10, the method further comprising modifying the output generated by the component by at least one of modifying at least one of a temperature of the environment in which the component operates, a humidity level of the environment in which the component operates, a magnetic field in which the component is positioned, a power of the at least one light source, or a wavelength of the at least one light source.

17. The system of claim 1, wherein at least one light source and the at least one photodetector are on opposite sides of the first plurality of gas cells.

* * * * *